US011176934B1

(12) United States Patent
Venkatesh Raman et al.

(10) Patent No.: US 11,176,934 B1
(45) Date of Patent: Nov. 16, 2021

(54) LANGUAGE SWITCHING ON A SPEECH INTERFACE DEVICE

(71) Applicant: Amazon Technologies, Inc., Seattle, WA (US)

(72) Inventors: Ashwin Venkatesh Raman, Toronto (CA); Bruno Dufour, Toronto (CA); Sasi Kiran Vepanjeri Lokanadha Reddy, Toronto (CA); Michal Kowalczuk, Gdansk (PL); Maciej Grabon, Gdansk (PL); Maciej Makowski, Aurora (CA); Fabian Andreas Bumberger, Toronto (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 300 days.

(21) Appl. No.: 16/362,408

(22) Filed: Mar. 22, 2019

(51) Int. Cl.
*G10L 15/22* (2006.01)
*G10L 15/00* (2013.01)
*G06F 3/16* (2006.01)
*G10L 15/19* (2013.01)

(52) U.S. Cl.
CPC .............. *G10L 15/22* (2013.01); *G06F 3/167* (2013.01); *G10L 15/005* (2013.01); *G10L 15/19* (2013.01); *G10L 2015/223* (2013.01)

(58) Field of Classification Search
CPC ....... G10L 15/22; G10L 15/005; G10L 15/19; G10L 2015/223; G06F 3/167
See application file for complete search history.

(56) References Cited

U.S. PATENT DOCUMENTS

| | | | |
|---|---|---|---|
| 2004/0117804 A1* | 6/2004 | Scahill | H04L 69/329 719/320 |
| 2017/0018268 A1* | 1/2017 | Quast | G10L 15/063 |
| 2019/0116260 A1* | 4/2019 | Ma | G10L 15/22 |
| 2019/0163466 A1* | 5/2019 | Kiyama | H04W 4/44 |
| 2019/0279613 A1* | 9/2019 | Wheeler | G10L 15/005 |

\* cited by examiner

*Primary Examiner* — Sonia L Gay
(74) *Attorney, Agent, or Firm* — Lee & Hayes, P.C.

(57) ABSTRACT

A speech interface device is configured to switch between languages, at the request of a user, in order to locally process utterances spoken in different languages, even in instances when a remote system is unavailable to, slower than, or otherwise less preferred than the speech interface device. For example, a user can request to set the language setting of the speech interface device to a second language, different from a first language to which the language setting of the device is currently set. Based on this user request, a local speech processing component of the device may load a language model(s) associated with the second language. The speech interface can also output voice prompts in the second language to manage the user's experience while a language update is in progress on the speech interface device.

20 Claims, 7 Drawing Sheets

LANGUAGE SWITCHING ON A SPEECH INTERFACE DEVICE

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
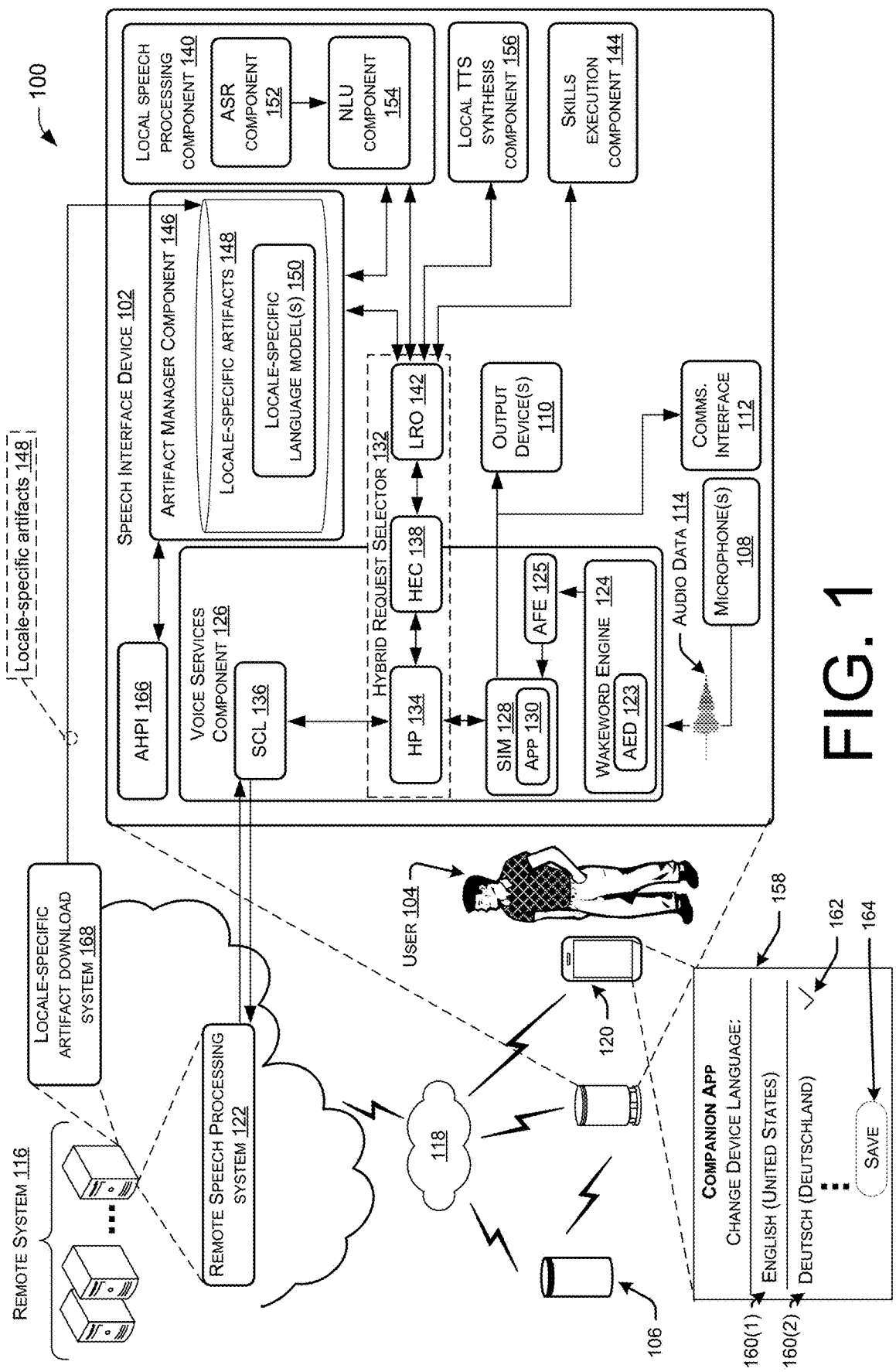
FIG. 1 is a block diagram illustrating a system including a speech interface device that is capable of switching between locales in order to locally process utterances spoken in different languages.

Described herein are, among other things, techniques, devices, and systems, including a speech interface device that is configured to switch between locales, at the request of a user, in order to locally process utterances spoken in different languages. That is, the language switching capability described herein allows the speech interface device to process speech in various spoken languages, even in instances when a remote system—which, when available, can be used for processing user speech remotely—is, for example, unavailable to, slower than (with network-related latency factored in), or otherwise less preferred than the speech interface device. The speech interface can also manage the user's experience while a language update is in progress on the speech interface device, as described in more detail below. A "locale," as used herein, means an identifier that represents a geographical region or place where a particular language is spoken by humans in that region or place. A locale may enable programmers to provide functionality and language variants to users of a speech interface device who may speak different languages.

In an illustrative example, a speech interface device may reside within an environment (e.g., in a home, automobile, office, hotel, etc.), perhaps along with one or more additional devices (including, for example, other speech interface devices, one or more second devices, such as home automation devices, a mobile phone, tablet, TV, wireless speaker, etc.). The speech interface device is configured with "hybrid" functionality, which allows the speech interface device to process user speech locally as well as send the same audio data (or some derivative thereof) to a remote system for processing. The speech interface device can also be configured to decide on its own and/or be instructed (by the remote system) whether to respond to user speech using response data from a remote speech processing system, or response data from a local speech processing component. The hybrid functionality may also allow the speech interface device to process audio data (among other types of data) locally, and to determine whether conditions are met for triggering the execution of a rule(s). This hybrid functionality, allows the speech interface device to respond to user speech and/or to execute rules, even in instances when a remote system—which, when available, can be used for processing user speech remotely and/or for executing rules—is, for example, unavailable to, slower than (with network-related latency factored in), or otherwise less preferred than the speech interface device.

As mentioned, the speech interface device described herein is configured to switch between locales, at the request of a user, in order to locally process utterances spoken in different languages. For example, a language setting of the speech interface device may be set to a first language (e.g., English) spoken in a first locale (e.g., the United States). In order to locally process utterances that are spoken in the first language, the local speech processing component of the speech interface device may have loaded thereon one or more language models associated with the first language. These locale-specific language models may be used during speech processing (e.g., during automatic speech recognition (ASR) processing, natural language understanding (NLU) processing, etc.) to generate directive data that is processed to cause the speech interface device to perform an action (e.g., output an audible response via a speaker(s), display content on a display(s), and/or control the operation of a second device in the environment, etc.).

A user can request to set the language setting of the speech interface device to a second language (e.g., Deutsch) spoken in a second locale (e.g., Deutschland). Based on this user request to change the language setting, the local speech processing component may load one or more language models associated with the second language, which the speech interface device may download from a remote system in response to the user's request (if the language model(s) is/are not already stored in memory of the speech interface device). The time it takes to load, and to download (if necessary), the new language model(s) can vary depending on network latency and/or the amount of processing resources of the speech interface device in use at the time the locale is being updated on the device. In light of this variable, a user may try to interact with the speech interface device while the language update is still in progress. In this scenario, the speech interface device is configured to manage the user experience while a language update is in progress. For example, a first component (e.g., a hybrid execution controller (HEC) component) of the speech interface device is configured to manage connections with one or more second components (e.g., hybrid proxy (HP) components), the second (e.g., HP) component(s) configured to send audio data to the first component (e.g., the HEC) for purposes of processing user speech locally on the speech interface device. The speech interface device may have its own second (e.g., HP) component executing thereon that is configured to connect to the first (e.g., HEC) component of the same speech interface device for purposes of exchanging data therebetween to enable local speech processing on the speech interface device. In some embodiments, the first (e.g., HEC) component is configured to connect to additional (e.g., third, fourth, fifth, etc.) components, which may be HP components, of additional speech interface devices that are collocated in an environment with the speech interface device, or that are otherwise in communication with the speech interface device over a computer network. Regardless of the number of speech interface devices in the environment, one or more HP-to-HEC connections can be managed (e.g., by disconnecting from, or connecting to, the HP component(s)) based at least in part on the locale(s) associated with the HP component(s) and based at least in part on the ready state of the local speech processing component. For instance, HP components that try to connect with the HEC component while a language update is in progress can be rejected because the local speech processing component may be currently unable (e.g., not ready) to process audio data representing user speech of a particular spoken language, and the HEC can send metadata to the rejected HP component. The metadata may instruct the HP component to try to connect with the HEC component after a period of time, and to output a voice prompt in the second language if an utterance happens to be detected while the language update is in progress. The voice prompt may inform the user that a language update is in progress, and to try again later.

The techniques and systems described herein may provide various technical benefits. For instance, the ability of the speech interface device to switch between locales allows the speech interface device to process speech in various spoken languages, even in instances when a remote system—which, when available, can be used for processing user speech remotely—is, for example, unavailable to, slower than (with network-related latency factored in), or otherwise less preferred than the speech interface device. This means that the speech interface device is able to process speech in a particular language, even if the speech interface device is unable to get a response from a remote speech processing system. This ability to support "offline" speech processing in a desired spoken language improves the user experience with the speech interface device. In addition, a user's expectations can be managed (e.g., through the use of voice prompts in the spoken language to which the device is switching) while a language update is in progress on the speech interface device. Lastly, techniques are described herein for managing memory resources efficiently on a resource-constrained speech interface device by "swapping out" language models when updating the language settings of the speech interface device, which conserves local computing resources of the speech interface device.

FIG. 1 is a block diagram illustrating a system 100 including a speech interface device 102 that is capable of switching between locales in order to locally process utterances spoken in different languages. The speech interface device 102 may be located within an environment to provide various capabilities to a user 104, when the user 104 is also in the environment. The environment in which the speech interface device 102 is located may be a home or other premises, an automobile, or any similar environment. Such an environment may include other devices including additional speech interface devices, such as the speech interface device 106, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 108, and responding in various ways, such as by outputting content via an output device(s) 110, which may be a speaker(s), a display(s), or any other suitable output device 110. In addition, the speech interface device 102 may be configured to respond to user speech by controlling second devices that are collocated in the environment with the speech interface device 102, such as by sending a command to a second device via a communications interface 112 (e.g., a short range radio), the command instructing an operation to be performed at the second device (e.g., to turn on a light in the environment). In addition to using the microphone(s) 108 to capture utterances and convert them into digital audio data 114, the speech interface device 102 may additionally, or alternatively, receive audio data 114 (e.g., via the communications interface 112) from another speech interface device 106 in the environment, such as when the other speech interface device 106 captures an utterance from the user 104 and sends the audio data 114 to the speech interface device 102. This may occur in situations where the other speech interface device 106 is closer to the user 104 and is configured to leverage the "hybrid" capabilities of the speech interface device 102. Additionally, or alternatively, this may occur in situations where the other speech interface device 106 fails to recognize an intent using one or more language models associated with a spoken language supported by the speech interface device 106 and is configured to send the audio data to the speech interface device 102, which may be able to recognize an intent using one or more language models associated with a different spoken language supported by the speech interface device 102.

Under normal conditions, the speech interface device 102 may operate in conjunction with and/or under the control of a remote, network-based or network-accessible control system 116 (abbreviated to "remote system" 116 in FIG. 1). The remote system 116 may, in some instances be part of a network-accessible computing platform that is maintained and accessible via a wide area network 118. Network-accessible computing platforms such as this may be referred to using terms such as "on-demand computing", "software as a service (SaaS)", "platform computing", "network-accessible platform", "cloud services", "data centers", and so forth. The remote system 116 may be configured to provide particular functionality to large numbers of local (e.g., in-home, in-car, etc.) devices of different users. The wide area network 118 is representative of any type of public or private, wide-area network, such as the Internet, which extends beyond the environment of the speech interface device 102. Thus, the wide area network 118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The term "local" is used herein as an adjective that describes a common attribute of devices, components, processing operations, and resources (e.g., computing resources, such as processing resources, memory resources, networking resources, etc.). As used herein, a "local" device, component, processing operation, and/or resource can be one that is located, or performed, in the environment of the speech interface device 102. By contrast, a device, component, processing operation, and/or resource that is located, or performed, at a geographically remote location, such as the geographically remote location of the remote system 116, is not considered to be a "local" device, component, processing operation, and/or resource. Thus, a "local" component may be a physical, logical and/or functional component of the speech interface device 102 itself, or a physical, logical and/or functional component that is located in the environment of the speech interface device 102 and is in communication (e.g., in short-range wired or wireless communication) with the speech interface device 102. A contrasting example is a component of a server that is located at a geographically remote location and is part of the remote system 116; such a component is not considered a "local" component, as the term "local" is used herein. A "local" device can be a device that is located in the environment of the speech interface device 102. For instance, the second speech interface device 106 shown in FIG. 1 is an example of a local device. Similarly, a pair of electronic ear buds that are worn by the user 104 in the vicinity of (e.g., less than a threshold distance from) the speech interface device 102, or a user device 120, such as a phone, a tablet, or a similar device, carried by the user 104 in the vicinity of the speech interface device 102, are each considered to be an example of a "local" device. When processing operations are described herein as being performed "locally," this means that they are performed at least in part by the speech interface device 102 and/or a component thereof. However, this does not preclude the possibility that another local component and/or device that is located in the environment of the speech interface device 102 may perform some of those "locally-performed" processing operations using its own resources, and/or using the resources of the speech interface device 102. In some embodiments, "local" processing operations are operations performed exclusively by the speech interface device 102. In some embodiments, a "local" device means exclusively the speech interface device 102 and does not include devices that are external or peripheral to the speech interface device 102. That is, local processing may comprise processing that is done within a common environment but across multiple collocated devices, while in other instances local processing may be done within a single device.

In some embodiments, the remote system 116 may be configured to receive audio data 114 from the speech interface device 102, to recognize speech in the received audio data 114 using a remote speech processing system 122, and to perform functions in response to the recognized speech. In some embodiments, these functions involve sending directives, from the remote system 116, to the speech interface device 102 to cause the speech interface device 102 to perform an action, such as output an audible response to the user speech via a speaker(s) (i.e., an output device(s) 110), and/or control second devices in the environment by sending a control command via the communications interface 112. Thus, under normal conditions, when the speech interface device 102 is able to communicate with the remote system 116 over a wide area network 118 (e.g., the Internet), some or all of the functions capable of being performed by the remote system 116 may be performed by sending a directive(s) over the wide area network 118 to the speech interface device 102, which, in turn, may process the directive(s) for performing an action(s). For example, the remote system 116, via a remote directive that is included in remote response data, may instruct the speech interface device 102 to output an audible response (e.g., using text-to-speech (TTS)) to a user's question, to output content (e.g., music) via a speaker of the speech interface device 102, and/or to turn on/off a light in the environment. It is to be appreciated that the remote system 116 may be configured to provide other functions, in addition to those discussed herein, such as, without limitation, providing step-by-step directions for navigating from an origin to a destination location, conducting an electronic commerce transaction on behalf of the user 104 as part of a shopping function, establishing a communication session between the user 104 and another user, and so on.

The speech interface device 102 may have a language setting that can be set/changed by the user 104 to enable the user 104 to interact with the speech interface device 102 in a particular spoken language. In an illustrative example, consider a scenario where the language setting of the speech interface device 102 is set to a first language (e.g., English) spoken in a first locale (e.g., the United States). Accordingly, the user 104 can interact with the speech interface device 102 by speaking to it in the first language (e.g., English). For instance, the user 104 may utter an expression in the first language, such as "Alexa, turn off the kitchen lights." Whether this utterance is captured by the microphone(s) 108 of the speech interface device 102 or captured by another speech interface device 106 in the environment, the audio data 114 representing this user's speech is ultimately received by a wakeword engine 124 of a voice services component 126 executing on the speech interface device 102. The wakeword engine 124 may be configured to compare the audio data 114 to stored models used to detect a wakeword (e.g., "Alexa") that indicates to the speech interface device 102 that the audio data 114 is to be processed for determining an intent. These stored models may be associated with the first language (e.g., English). Thus, the wakeword engine 124 is configured to determine whether a wakeword is detected in the audio data 114, and, if a wakeword is detected, the wakeword engine 124 can proceed with routing the audio data 114 to an audio front end (AFE) 125 (sometimes referred to as acoustic front end (AFE) 125) of the voice services component 126. If a wakeword is not detected in the audio data 114, the wakeword engine 124 can refrain from sending the audio data 114 to the AFE 125, thereby preventing the audio data 114 from being further processed. The audio data 114 can be discarded in this situation.

In some embodiments, the wakeword engine 124 may include an acoustic event detector (AED) 123. The AED 123 may be configured to compare the audio data 114 to stored models used to detect an acoustic or audio event that indicates to the speech interface device 102 that the audio data 114 is to be processed for determining an intent for the detected audio event. For example, an audio event might be the sound of a hand clap, the sound of breaking glass, the sound of a baby crying, or the like, that is detected in the audio data 114. In other words, the AED 123 is configured to detect non-speech events in the audio data 114.

The AFE 125 is configured to transform the audio data 114 received from the wakeword engine 124 into data for processing by a suitable ASR component and/or NLU component. The AFE 125 may reduce noise in the audio data 114 and divide the digitized audio data 114 into frames representing a time intervals for which the AFE 125 determines a number of values, called features, representing the qualities of the audio data 114, along with a set of those values, called a feature vector, representing the features/qualities of the audio data 114 within the frame. Many different features may be determined, and each feature represents some quality of the audio data 114 that may be useful for ASR processing and/or NLU processing. A number of approaches may be used by the AFE 125 to process the audio data 114, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 125 is configured to use beamforming data to process the received audio data 114. Beamforming can be used to distinguish between the directions from which speech and noise originate. Accordingly, the microphones 108 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 114, used by the AFE 125 in beamforming, may be determined based on results of the wakeword engine's 124 processing of the audio data 114. For example, the wakeword engine 124 may detect the wakeword in the audio data 114 from a first microphone 108 at time, t, while detecting the wakeword in the audio data 114 from a second microphone 108 a millisecond later in time (e.g., time, t+1 millisecond), and so on and so forth, for any suitable number of audio signals corresponding to multiple microphones 108 in a microphone array.

A speech interaction manager (SIM) 128 of the voice services component 126 may receive the audio data 114 that has been processed by the AFE 125. The SIM 128 may manage received audio data 114 by processing utterances and non-speech noise or sounds as events, and the SIM 128 may also manage the processing of directives that are used to respond to the user speech or non-speech noise or sounds (e.g., by controlling the action(s) of the speech interface device 102). The SIM 128 may include one or more client applications 130 for performing various functions at the speech interface device 102.

A hybrid request selector 132 (or, hybrid request selector component 132) of the speech interface device 102 is shown as including a hybrid proxy (HP) 134 (or, hybrid proxy (HP) subcomponent 134), among other subcomponents. The terms "subcomponent" and "component" may be used interchangeably herein to mean any component of the speech interface device 102. The HP 134 can be implemented as a layer within the voice services component 126 that is located between the SIM 128 and a speech communication library (SCL) 136, and may be configured to proxy traffic to/from the remote system 116. For example, the HP 134 may be configured to pass messages between the SIM 128 and the SCL 136 (such as by passing events and directives there between), and to send messages to/from a hybrid execution controller (HEC) 138 (or, hybrid execution controller (HEC) subcomponent 138) of the hybrid request selector 132. For instance, directive data received from the remote system 116 can be sent to the HEC 138 using the HP 134, which sits in the path between the SCL 136 and the SIM 128. The HP 134 may also be configured to allow audio data 114 received from the SIM 128 to pass through to the remote system 116 (e.g., to the remote speech processing system 122) (via the SCL 136) while also receiving (e.g., intercepting) this audio data 114 and sending the received audio data to the HEC 138 (sometimes via an additional SCL).

As will be described in more detail below, the HP 134 and the HEC 138 are configured to perform a handshake procedure to connect to each other. As part of this handshake procedure, the HP 134 and the HEC 138 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 138 determines whether to accept or reject the connection request from the HP 134. If the HEC 138 rejects the HP's 134 connection request, the HEC 138 can provide metadata to the HP 134 that provides a reason why the connection request was rejected. In some cases, the metadata may inform the HP 134 as to whether the HP 134 should retry to connect periodically with the HEC 138, such as when a language update is in progress and the language associated with the HP 134 will eventually be supported once the language update is complete, but, until then, the local speech processing component 140 of the speech interface device 102 is not ready to process audio data representing utterances spoken in a particular language because the language model(s) for that language is still downloading and/or loading. Based on the metadata sent with a rejection of a connection request, the HP 134 may also respond to user speech with a voice prompt in the language that is to be supported upon completion of the language update.

A local speech processing component 140 (sometimes referred to as a "speech processing component" 140, a "spoken language understanding (SLU) component" 140, a "speech engine" 140, or an "engine" 140) is configured to process audio data 114 (e.g., audio data 114 representing user speech, audio data 114 representing non-speech noise or sounds, etc.). In some embodiments, the hybrid request selector 132 may further include a local request orchestrator (LRO) 142 (or, local request orchestrator (LRO) subcomponent 142). The LRO 142 is configured to notify the local speech processing component 140 about the availability of new audio data 114 that represents user speech, and to otherwise initiate the operations of the local speech processing component 140 when new audio data 114 becomes available. In general, the hybrid request selector 132 may control the execution of the local speech processing component 140, such as by sending "execute" and "terminate" events/instructions to the local speech processing component 140. An "execute" event may instruct the local speech processing component 140 to continue any suspended execution based on audio data 114 (e.g., by instructing the local speech processing component 140 to execute on a previously-determined intent in order to generate a directive). Meanwhile, a "terminate" event may instruct the local speech processing component 140 to terminate further execution based on the audio data 114, such as when the speech interface device 102 receives directive data from the remote system 116 and chooses to use that remotely-generated directive data.

The LRO 142 may also receive data from the local speech processing component 140, such as status data indicating the ready state of the local speech processing component 140 via a state variable whose value indicates the local speech processing component's 140 readiness to process audio data representing an utterance in a particular spoken language. The readiness of the local speech processing component 140 may depend at least in part upon whether the local speech processing component 140 has loaded the appropriate locale-specific language models to be able to process speech in the particular spoken language. The LRO 142 may also interact with the HEC 138, such as to notify the HEC 138 of a change in the ready status (e.g., a change in the state variable) of the local speech processing component 140 so that the HEC 138 can determine how to manage a connection with the HP 134, as well as connections with additional HPs of additional speech interface devices that may be collocated in the environment, such as the speech interface device 106. The LRO 142 may also interact with a skills execution component 144 that is configured to receive intent data output from the local speech processing component 140 and to execute a skill based on the intent. The LRO 142 may also interact with an artifact manager (AM) 146 (or, artifact manager component 146) of the speech interface device 102 that is configured to maintain locale-specific artifacts 148 (e.g., compiled data associated with a particular language, which may be spoken in a particular locale) at a storage location in the memory of the speech interface device 102 that is accessible to the local speech processing component 140. The artifact manager 146 may be configured to update the artifacts in the memory of the speech interface device 102 (e.g., store new locale-specific artifacts 148 in local memory) at various times, and in response to various events or criteria being met.

An "artifact," as used herein, means compiled data that is executable by one or more subcomponents of a speech processing system, such as subcomponents of the local speech processing component 140, when responding to user speech. Examples of artifacts include, without limitation, language models 150 (e.g., ASR models (e.g., acoustic models, etc.), NLU models (e.g., grammar models, etc.)), ER data (e.g., lexical data, including association data that associates names of entities with canonical identifiers of those entities, etc.), TTS models (e.g., models used to process text and to generate an output audio stream of synthesized speech), skill prompts, and/or other voice prompts. The locale-specific artifacts 148 stored in memory of the speech interface device, as its name implies, are associated with a language (e.g., English) spoken in a specific locale (e.g., the United States). These artifacts 148 can include "static" or "dynamic" artifacts. A static artifact (e.g., a static language model 150, such as a static ASR model, a static NLU model, etc.) does not include personalization, and, thus, is the same for different users of a user group. For example, different users associated with a common geographic location, area, or locale, and/or different users of a common device type or version of a speech interface device 102, may have the same static artifact(s) downloaded on their respective speech interface devices 102. Static artifacts may be infrequently updated as compared to a frequency at which dynamic artifacts are updated. A dynamic artifact (e.g., a dynamic language model 150, such as a dynamic ASR model, a dynamic NLU model, etc.) may vary across users of a user group. A personalized artifact is an example of a dynamic artifact because a personalized artifact (e.g., a personalized ASR model, a personalized NLU model, etc.) is generated for a particular user or user account, such as a user account of the user 104 shown in FIG. 1. A personalized artifact allows subcomponents of the local speech processing component 140 to understand a spoken form of a word(s) or phrase(s) in user speech that is associated with a particular user account (and, hence, associated with a user 104 associated with the user account), whereas, a static artifact does not, by itself, allow for such recognition of personal words or phrases (e.g., words or phrases associated with a user account that are not recognizable, understandable, or the like, using a static artifact (e.g., a static language model 150, such as a static ASR model, a static NLU model, etc.)). In some embodiments, the compiled form of the locale-specific artifacts 148 includes one or more locale-specific finite state transducers (FST) that are usable, by the local speech processing component 140, to process an utterance spoken in a language of a specific locale. A FST may include a compressed graph structure that relates to words and/or phrases (e.g., names of entities, personal expressions of intent, etc.) that may be unique to the specific locale.

To illustrate how the speech interface device 102 can operate at runtime, consider an example where the language setting of the speech interface device 102 is presently set to a first language (e.g., English) spoken in a first locale (e.g., United State). When the user 104 utters an expression in the first language, such as "Alexa, turn off the kitchen lights," the audio data 114 is received by the wakeword engine 124, which detects the wakeword "Alexa," and forwards the audio data 114 to the SIM 128 via the AFE 125 as a result of detecting the wakeword. The SIM 128 may send the audio data 114 to the HP 134, and the HP 134 may allow the audio data 114 to pass through to the remote system 116 (e.g., via the SCL 136), and the HP 134 may also input the audio data 114 to the local speech processing component 140 by routing the audio data 114 through the HEC 138 of the hybrid request selector 132, whereby the LRO 142 notifies the local speech processing component 140 of the incoming audio data 114. At this point, the hybrid request selector 132 may wait for response data from the remote system 116 and/or the local speech processing component 140.

The local speech processing component 140 is configured to receive the audio data 114 from the hybrid request selector 132 as input, to recognize speech (and/or non-speech audio events) in the audio data 114, to determine an intent (e.g., user intent) from the recognized speech (or non-speech audio event). This intent can be provided to the skills execution component 144 via the LRO 142, and the skills execution component 144 can determine how to act on the intent by generating directive data. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the skills execution component 144 (and/or the remote speech processing system 122) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 118. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local speech processing component 140 may include an automatic speech recognition (ASR) component 152 (or, ASR subcomponent 152) that is configured to perform ASR processing on the audio data 114 to convert the audio data 114 into text data (sometimes referred to herein as "ASR text data," an "ASR result", or "ASR data"). ASR transcribes audio data 114 into text data representing the words of the user speech contained in the audio data 114. A spoken utterance in the audio data 114 can be input to the ASR component 152, which then interprets the utterance based on the similarity between the utterance and pre-established language models 150 available to the local speech processing component 140. The language models 150 utilized by the ASR component 152 may be associated with the first language (e.g., English) spoken in the first locale (e.g., the United States) because of the current language setting of the speech interface device 102. The ASR component 152 may compare the input audio data 114 with models 150 for sounds (e.g., subword units or phonemes) and sequences of sounds to identify words that match the sequence of sounds spoken in the utterance of the audio data 114. In some embodiments, the ASR component 152 outputs the most likely text recognized in the audio data 114, or multiple hypotheses in the form of a lattice or an N-best list with individual hypotheses corresponding to confidence scores or other scores (such as probability scores, etc.). In some embodiments, the ASR component 152 is customized to the user 104 (or multiple users) who created a user account to which the speech interface device 102 is registered. For instance, the language models 150 (and other data) used by the ASR component 152 may be based on known information (e.g., preferences) of the user 104, and/or on a history of previous interactions with the user 104.

The local speech processing component 140 may also include a NLU component 154 (or, NLU subcomponent 154) that performs NLU processing on the generated ASR text data to determine intent data and/or slot data (referred to herein as a "NLU result", or "NLU data") so that directives may be determined (e.g., by the skills execution component 144) based on the intent data and/or the slot data. Generally, the NLU component 154 takes textual input (such as text data generated by the ASR component 152) and attempts to make a semantic interpretation of the ASR text data. That is, the NLU component 154 determines the meaning behind the ASR text data based on the individual words, and then the NLU component 154 can implement that meaning. The NLU component 154 interprets a text string to derive an intent or a desired action or operation from the user 104. This may include deriving pertinent pieces of information in the text that allow the NLU component 154 to identify a second device in the environment, if the user 104, for example, intends to control a second device (e.g., a light(s)) in the user's 104 house. The local speech processing component 140 may also provide a dialog management function to engage in speech dialogue with the user 104 to determine (e.g., clarify) user intents by asking the user 104 for information using speech/voice prompts. In some embodiments, the NLU component 154 is customized to the user 104 (or multiple users) who created a user account to which the speech interface device 102 is registered. For instance, data used by the NLU component 154 to understand the meaning of ASR text may be based on known information (e.g., preferences) of the user 104, and/or on a history of previous interactions with the user 104.

The NLU component 154 is configured to utilize locale-specific language models 150 (e.g., locale-specific NLU models, such as locale-specific named entity recognition (NER) models, locale-specific intent classification (IC) models, etc.) to perform NLU processing. In general, the locale-specific language models 150 described herein may represent any suitable trained machine learning model, including a single model or an ensemble of base-level machine learning models, and may be implemented as any type of machine learning model. For example, suitable language models 150 include, without limitation, conditional random field (CRF) models, maximum entropy models, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some embodiments, the local speech processing component 140 may also include, or be configured to use, one or more installed speechlets. Speechlets may represent domains that are used by the skills execution component 144 in order to determine how to act on an utterance in a particular way, such as by outputting a directive that corresponds to the determined intent, and which can be processed to implement the desired operation. Accordingly, the term "speechlet" may be used interchangeably herein with the term "domain" or "domain implementation." The speechlets installed on the speech interface device 102 may include, without limitation, a music speechlet (or music domain) to act an utterances with intents to play music on a device, such as via a speaker(s) of the speech interface device 102, a navigation speechlet (or a navigation domain) to act on utterances with intents to get directions to a point of interest with a known address, a shopping speechlet (or shopping domain) to act on utterances with intents to buy an item from an electronic marketplace, and/or a device control speechlet (or device control domain) to act on utterances with intents to control a second device(s) in the environment.

In order to generate a particular interpreted response, the NLU component 154 may apply grammar models (i.e., models 150) and lexical information associated with the respective domains or speechlets to recognize one or more entities in the text of the query. In this manner the NLU component 154 may identify "slots" (i.e., particular words in query text) that may be needed for later command processing. Depending on the complexity of the NLU component 154, it may also label each slot with a type of varying levels of specificity (such as noun, place, city, artist name, song name, device name, or the like). Each grammar model used by the NLU component 154 may include the names of entities (i.e., nouns) commonly found in speech (of a given language spoken in a given locale) about the particular domain (e.g., generic terms), whereas the lexical information (e.g., from a gazetteer) is personalized to the user(s) and/or the device. For instance, a grammar model associated with the navigation domain may include a database of words of a spoken language that are commonly used when people discuss navigation. Again, these models 150 may be specific to the first locale in which the first language is spoken, based on the current language setting of the speech interface device 102.

Accordingly, the intents identified by the NLU component 154 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU component 154 may parse the query to identify words as subject, object, verb, preposition, etc., based on grammar rules and/or models 150, prior to recognizing named entities. The identified verb may be used by the NLU component 154 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 154 may then search the corresponding fields in the domain-specific and personalized lexicon(s), attempting to match words and phrases in the query tagged as a grammatical object or object modifier with those identified in the database(s). This intent can be provided to the skills execution component 144 via the LRO 142, and the skills execution component 144 can determine how to act on the intent by generating directive data.

The speech interface device 102 may also include a local text-to-speech (TTS) synthesis component 156 that may be used to output audible TTS responses to the processed user speech. For example, the local TTS synthesis component 156 may be utilized to answer the user's 104 question regarding the weather (e.g., outputting the following synthesized speech: "Today's forecast is 68 degrees and sunny, with a slight chance of rain"). The local TTS synthesis component 156 may interface with the LRO 142 in order to receive text that is to be processed into an output audio stream, and to generate the output audio stream of synthesized speech from the received text. The local TTS synthesis component 156 may utilize one or more locale-specific TTS models, stored in the locale-specific artifacts 148, to generate the output audio stream of synthesized speech, which is ultimately output via a speaker(s) (i.e., output device(s) 110) of the speech interface device 102. The skills execution component 144, when a skill is invoked in response to processed user speech, may send a skill prompt to the local TTS synthesis component 156 (e.g., via the LRO 142) for outputting the skill prompt as audio (e.g., synthesized speech) via a speaker(s) of the speech interface device 102. In an example, outputting the skill prompt as audio may be accomplished by sending and processing the audio data through the LRO 142, the HEC 138, the HP 134, the SIM 128, and ultimately to the output device(s) 110. For example, if a "announcement" skill is invoked to play an announcement on another speech interface device 106 in the environment, a skill prompt in the form of text can be sent to the local TTS synthesis component 156 for processing into audio data that can be output as the following synthesized speech: "announcing."

When audio data 114 is processed locally on the speech interface device 102, the LRO 142 can notify the local speech processing component 140 that an "interaction" has started, and the audio data 114 can be input to the local speech processing component 140 where the ASR and/or NLU processing, among other processing operations, ensues for recognizing user speech. After determining local intent data, or failing to do so, the local speech processing component 140 may send response data to the hybrid request selector 132, such as a "ReadyToExecute" response, which can indicate that the local speech processing component 140 has recognized an intent, or that the local speech processing component 140 is ready to communicate failure (if the local speech processing component 140 could not recognize an intent via the NLU component 154). The hybrid request selector 132 may then determine whether to use local directive data (e.g., generated by the skills execution component 144) to respond to the audio data 114, or whether to use directive data received from the remote system 116, assuming a remote response is even received (e.g., when the speech interface device 102 is able to access the remote speech processing system 122 over the wide area network 118). In a scenario where the hybrid request selector 132 chooses remote directive data to respond to audio data 114, the microphone(s) 108 may be closed so that no more audio data is processed through the local speech processing component 140, and the local speech processing component 140 finishes processing whatever audio data it has already ingested. In a scenario where the hybrid request selector 132 chooses local directive data, an "Execute" command may be sent by the hybrid request selector 132 to the local speech processing component 140, causing the skills execution component 144 to generate local directive data.

As mentioned, the user 104 can change the language setting of the speech interface device 102 to interact with it in a different spoken language. For example, if the user 104 wants to change (or otherwise set) the language setting of the speech interface device 102 to a second language (e.g., Deutsch) spoken in a second locale (e.g., Deutschland), the user 104 can provide user input to a user device 120 or to the speech interface device 102 to initiate this request to switch the locale of the speech interface device 102. The request to change the language setting can be done on a per-device level. For instance, the user 104 can request to set the language setting of the speech interface device 102 to the second language (e.g., Deutsch), and may keep the language setting of the other speech interface device 106 set to the first language (e.g., English). In some embodiments, the user 104 can submit a language setting request on a group level (e.g., set all of my speech interface devices that are downstairs to Deutsch).

The user's 104 request to set the language setting of the speech interface device 102 to the second language can be done using a companion application (or "app") or a website accessed via a user device, such as the user device 120. FIG. 1 shows a user interface 158 that may be presented on a display of the user device 120 (or on a display of the speech interface device 102, if the speech interface device 102 includes a display). The user interface 158 in FIG. 1 represents a companion app, and FIG. 1 shows that the user 104 has navigated to a menu where the user 104 can change the device language (e.g., the language setting) of the speech interface device 102. The user interface 158 depicts an example where the languages supported by the speech interface device 102 include a first language 160(1) spoken in a first locale, which is shown as U.S. English, and a second language 160(2) spoken in a second locale, which is shown as Deutschland Deutsch (or German spoken in Germany). It is to be appreciated that there may be any suitable number of supported languages 160 in addition to the two example languages shown in FIG. 1, as indicated by the ellipses in the user interface 158. For example, the user 104 may be able to scroll down to see additional languages 160 that the speech interface device 102 can support. Additional languages (locales) may include, without limitation, English (Canada), English (India), French (Canada), English (Australia/New Zealand), French (France), English (United Kingdom), Japanese (Japan), Chinese (China), Portuguese (Brazil), etc. Furthermore, as mentioned, a "locale," as used herein, means an identifier that represents a geographical region or place where a particular language is spoken by humans in that region or place. A locale may enable programmers to provide functionality and language variants to users of a speech interface device who may speak different languages. In some embodiments a locale may contain two components separated by an underscore or a hyphen (e.g., 5 characters, or more than 5 characters). For example, a locale may be represented generically by ll_CC, where ll is a 2-character code representing the language and CC is a 21-character code representing the country (or geographical region, more generally).

To request a change of the language setting from the first language 160(1) to the second language 160(2), the user 104 may touch the screen of the user device 120 at a location corresponding to the second language 160(2) on the user interface 158 in order to select the second language 160(2). Feedback may be provided to the user 104 in the form of an icon 162, such as a checkmark, to indicate that the user 104 has selected the second language 160(2). In some embodiments, the user interface 158 may include a "save" button 164 to submit the change request, which initiates the language update process (sometimes referred to herein as a "locale update process"). In some embodiments, the language switch (sometimes referred to herein as a "locale switch") may be triggered upon the user 104 selecting the desired language on the user interface 158 without any additional selection (e.g., the save button 164 may be omitted). It is to be appreciated that a request to change the language setting of the speech interface device 102 may be accomplished in other ways as well, such as by uttering a voice command to "change the language of my device to German," or by pressing a button on the speech interface device 102 to toggle to a different language, etc.

An Alexa Hybrid Engine Platform-specific Interfaces (AHPI) component 166 of the speech interface device 102 may receive the user's 104 request to change the language setting of the speech interface device 102 (e.g., to the second language 160(2)). The AHPI component 166 may respond by notifying the artifact manager 146 of the request to change the locale of the speech interface device 102. If a language setting request was received while the speech interface device 102 was powered off, the AHPI 166 may notify the artifact manager 146 on bootup of the speech interface device 102. The artifact manager 146 receives the indication of the request to change the locale from the AHPI component 166 and initiates a language switch process by instructing the local speech processing component 140 to unload the existing locale-specific language model(s) 150 associated with the first language 160(1), which are presently loaded by the local speech processing component 140 in volatile memory (e.g., volatile random access memory (RAM)) of the speech interface device 102 to enable local speech processing of utterances spoken in the first language 160(1). After unloading the language model(s) 150 associated with the first language, the artifact manager 146 can delete, from non-volatile memory (e.g., local storage, such as solid state storage, spinning disk, etc.) of the speech interface device 102, the language model(s) 150 associated with the first language 160(1) to free up memory resources, which may be useful on a resource-constrained speech interface device 102 that can store a limited number of models 150.

The local speech processing component 140 may, at any time before, during, or after the unloading and/or deletion of the language model(s) 150 associated with the first language 160(1), notify the LRO 142 of the language change request (sometimes referred to herein as a "locale change request"), whereby the local speech processing component 140 may indicate that its ready status (e.g., its state variable) has changed to a status of "not ready", which means that the local speech processing component is not ready to process audio data 114 representing utterances in either the first language 160(1) or the second language 160(2), in this particular example. This is because the unloading and deletion of the language model(s) 150 specific to the first language 160(1) has begun, is ongoing, or has completed, and, hence, utterances spoken in the first language 160(1) can no longer be processed locally. Furthermore, because the new language models 150 specific to the second language 160(2) have not been retrieved and loaded yet, utterances spoken in the second language 160(2) cannot be processed locally either. The LRO 142 can send status data to the HEC 138 indicating that the ready status (e.g., the state variable) of the local speech processing component 140 has changed to indicate that it is not ready to process audio data until the new model(s) 150 is/are retrieved and loaded. In general, the LRO 142 is a central point that accepts inputs from various local components of the speech interface device 102, produces or otherwise handles outputs, and handles events. The LRO 142 may also move data along workflows to produce an end result.

The HEC 138 may, in some cases, disconnect from the HP 134 if a locale attribute associated with the HP 134 is currently set to the first locale (the first language 160(1)). This is because the first language is no longer supported due to the request to change the language setting, at least in a case where the artifact manager 146 deletes the language model(s) 150 associated with the first language 160(1) to make room for the language model(s) 150 associated with the second language 160(2). Meanwhile, the artifact manager 146 may download, from the remote system 116 (e.g., from a locale-specific artifact download system 168), to non-volatile memory of the speech interface device 102, locale-specific artifacts 148 associated with the second language 160(2), if these artifacts 148 are not already stored in local non-volatile memory of the speech interface device 102. These locale-specific artifacts 148 can include one or more language models 150 associated with the second language 160(2), as well as TTS models, skill prompt data, voice prompt data, and the like. The local speech processing component 140 may, in turn, load artifacts specific to the second language 160(2) (e.g., the language model(s) 150 associated with the second language 160(2), etc.) from the non-volatile memory of the speech interface device 102 to volatile memory of the speech interface device 102 for use in processing speech in the second language 160(2) at runtime.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
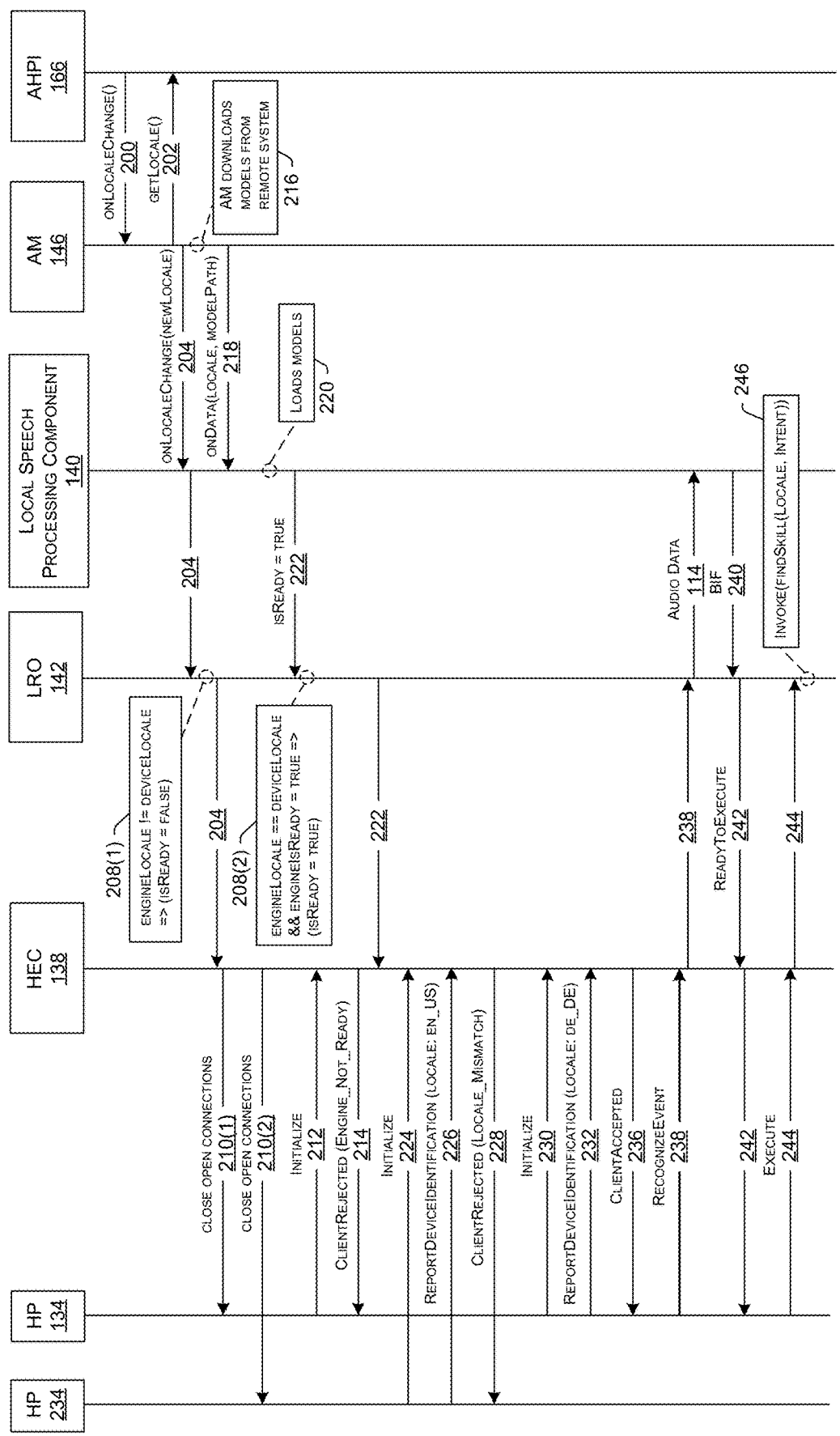
FIG. 2 is a diagram illustrating example signaling between executing components of a speech interface device, and between a hybrid proxy (HP) component executing on a second speech interface device, while switching to a new locale, and also while processing audio data representing user speech of a language that is spoken in the new locale.

FIG. 2 is a diagram illustrating example signaling between executing components of a speech interface device 102, and between a hybrid proxy (HP) component executing on a second speech interface device 106, while switching to a new locale, and also while processing audio data representing user speech of a language that is spoken in the new locale. The example signaling in FIG. 2 is exemplary, and it is to be appreciated that additional signaling may be added to, and particular signaling can be omitted from, the signaling that is shown by way of example in FIG. 2.

The signaling shown in FIG. 2 may start with the AHPI 166 sending event data 200 (e.g., an "onLocaleChange( )" event 200) to the artifact manager (AM) component 146 executing on the speech interface device 102. This event data 200 may be sent by the AHPI 166 in response to the speech interface device 102 receiving an indication of a request to set the language setting of the speech interface device 102 to a second/new language spoken in a second/new locale. As mentioned, this indication of a language setting request may be based on a user 104 using a companion application (or "app") or a website accessed via a user device, such as the user device 120 of FIG. 1. Alternatively, the user 104 may issue a voice command to the speech interface device 102 requesting to change the language setting of the device 102. These methods of issuing a change request are suitable for a "headless" speech interface device 102 that does not include a display. However, in instances where the speech interface device 102 includes a display(s), the user 104 may request to change the language setting by a menu that is similar to the companion application shown in FIG. 1, but presented on the display(s) of the speech interface device 102.

In the running example, consider a scenario where the language setting of the speech interface device 102 is currently set to a first language 160(1) (e.g., English) spoken in a first locale (e.g., the United States) at the time the AHPI 166 sends the event data 200, and where the event data 200 indicates to the artifact manager 146 that the user 104 has requested to set the language setting to a second language 160(2) (e.g., Deutsch) spoken in a second locale (e.g., Deutschland). It is to be appreciated that any suitable number of languages 160 can be supported by the speech interface device 102, and that these two languages are merely used as examples when switching from one language to another.

In response to receiving the event data 200, the artifact manager 146 may initially evaluate the language change request against the locale associated with the currently-loaded language model(s) 150. For example, if there isn't a mismatch between the existing locale and the new locale, then the artifact manager 146 may do nothing because the language setting of the speech interface device 102 is already set to the requested language. If, however, there is a mismatch between the existing locale and the new locale— e.g., if one or more language models 150 for U.S. English are currently loaded by the local speech processing component 140, and the user 104 is requesting to switch to Deutschland Deutsch, the artifact manager 146 may initiate the language change by triggering a series of events. Furthermore, a configuration property stored in memory of the speech interface device 102 may maintain a list of supported locales and/or languages, and the artifact manager 146 may determine whether to proceed with a language change request based on the configuration property indicating that the requested language (locale) is supported, and/or based on the availability of language model(s) 150 associated with the requested language (locale).

Accordingly, in response to receiving the event data 200, the artifact manager 146 may send notification data 202 (e.g., a "getLocale" notification 202) to the AHPI 166 confirming that the artifact manager 146 received the event data 200 and/or informing the AHPI 166 that the artifact manager 146 is starting the language change process, which will involve retrieving the language model(s) 150 associated with the second language 160(2) spoken in the second locale. Additionally, or alternatively, in response to receiving the event data 200, the artifact manager 146 may send event data 204 (e.g., an "onLocaleChange(newLocale)" event 204) to the local speech processing component 140. The event data 204 received by the local speech processing component 140 may specify the second/new locale to which the language setting is being switched. The event data 204 received by the local speech processing component 140 may also instruct the local speech processing component 140 to unload any existing language model(s) 150 associated with the first/existing language 160(1) spoken in the first locale. This may cause the local speech processing component 140 to unload the language model(s) 150 associated with the first language 160(1) from volatile memory of the speech interface device 102. In some embodiments, the unloading operation occurs just before loading the new models (e.g., at a time at which the new model(s) 150 is/are downloaded and ready to load). In some embodiments, the existing language model(s) 150 for the first language 160(1) remain loaded in volatile memory of the speech interface device 102 (e.g., the local speech processing component 140 may not unload the language model(s) 150 associated with the first language 160(1)). In other words, depending on how resource-constrained the speech interface device 102 is, the local speech processing component 140 may be configured to load language model(s) 150 exclusively for a single language 160 (and a single corresponding locale) at a time, or for multiple languages 160 (and multiple corresponding locales). In the case where the local speech processing component 140 is configured to load language model(s) 150 exclusively for a single language 160, the language model(s) 150 associated with the first/existing language 160(1) may be unloaded in order to load the language model(s) 150 associated with the second/new language 160(2). However, a speech interface device 102 that is less resource-constrained may be able to support loading multiple locales at a time, and, therefore, may, for example, keep the language model(s) 150 for the first language 160(1) loaded in volatile memory of the speech interface device 102 while loading the language model(s) 150 for the second language 160(2) to the volatile memory of the speech interface device 102. It is to be appreciated that there may be a practical limit on the number of language models 150 that can be simultaneously stored and loaded on a single speech interface device 102.

In response to receiving the event data 204, a state variable of the local speech processing component 140 may be changed from a first value (e.g., isReady=true) to a second value (e.g., isReady=false) to indicate that a language update is in progress and that the local speech processing component 140 is not ready to process audio data 114 representing an utterance spoken in a particular language(s) (e.g., the second language 160(2)). The local speech processing component 140 may also send the event data 204 (e.g., the onLocaleChange(newLocale) event 204) to the LRO 142. The event data 204 received by the LRO 142 may include first status data 208(1) indicating that a language update is in progress (e.g., engineLocale !=deviceLocale) and that the state variable of the local speech processing component 140 has been set to the second value (e.g., isReady=false). The LRO 142 may, in turn, send the event data 204 to the HEC 138. This event data 204 received by the HEC 138 may also include the first status data 208(1) indicating, to the HEC 138, that a language update is in progress (e.g., engineLocale !=deviceLocale) and that the state variable of the local speech processing component 140 has been set to the second value (e.g., isReady=false), which means that the local speech processing component 140 is not ready to process audio data 114 representing an utterance spoken in a particular language(s) (e.g., the second language 160(2)).

In response to receiving the event data 204, or in response to a signal(s) received from an HP component(s), the HEC 138 may close one or more open connections with one or more corresponding HP components by sending disconnection instruction data 210 (e.g., a disconnection instruction(s) 210) to those HP components, where the HP components that receive the disconnection instructions 210 are selected based on a policy. This policy may, for example, instruct the HEC 138 to close connections with HP components that are associated with a language that is not currently supported. In the running example where the speech interface device 102 is switching from a first language 160(1) spoken in a first locale to a second language 160(2) spoken in a second locale, the speech interface device 102 cannot support either of these languages/locales during the language change process. As a result, the HEC 138 may close all of its HP-to-HEC connections by sending disconnection instruction data 210 to all HP components. These languages are not supported during the language switch because the local speech processing component 140 may be unable to respond to user speech in the first language 160(1) due to the unloading of the language model(s) 150 for the first language 160(1), and may be unable to respond to user speech in the second language 160(2) until the language model(s) 150 for the second language 160(2) are loaded by the local speech processing component 140 to volatile memory of the speech interface device 102. If, on the other hand, the speech interface device 120 is capable of having language models 150 for multiple languages (multiple locales) loaded in volatile memory simultaneously, the language model(s) 150 associated with the first language 160(1) may remain loaded during the language switch, and, in this case, the HEC 138 may refrain from closing the open connections with HP components that are associated with the first language 160(1) spoken in the first locale because the local speech processing component 140 may be able to process speech in the first language 160(1) using the language model(s) 150 that remain loaded during the language switch. In the example of FIG. 2, the HEC 138 is shown to send disconnection instruction data 210(1) to the HP 134 that is executing on the speech interface device 102, and the HEC 138 is also shown to send disconnection instruction data 210(2) to a second HP 234 that is executing on a second speech interface device, such as the speech interface device 106. This second speech interface device 106 may be collocated in the same environment with the speech interface device 102 such that the disconnection instruction data 210(2) may be sent to the HP 234 via a local area network.

The HP components 134, 234 that have been disconnected from the HEC 138 may be configured to initialize a connection with the HEC 138 in response to being disconnected therefrom (e.g., immediately or after waiting a period of time since being disconnected, and/or after an event). Accordingly, in the example of FIG. 2, the HP 134 executing on the speech interface device 102 may send connection request data 212 (e.g., an "initialize" request 212, or a connection request 212) to the HEC 138 to reconnect with the HEC 138. This connection request 212 may be part of a handshake process that occurs whenever the requesting HP has been disconnected, and/or upon an initial bootup of the speech interface device hosting the requesting HP. Accordingly, when the HEC 138 disconnects from the HP 134, the HP 134 is configured to initiate the handshake process with the HEC 138 by sending the connection request 212.

As mentioned, as part of this handshake procedure, the HP 134 and the HEC 138 may exchange data including, without limitation, configurations, context, settings, device IDs, networking protocol versions, time zones, and language data. Based on at least some of this data (e.g., based at least in part on the language data) exchanged during the handshake procedure, and based at least in part on the ready status of the local speech processing component 140, the HEC 138 can determine whether to accept or reject the connection request from the HP 134. If the HEC 138 rejects the HP's 134 connection request, the HEC 138 can provide metadata to the HP 134 that provides a reason why the connection request 212 was rejected. In the example of FIG. 2, the first status data 208(1) indicates to the HEC 138 that the local speech processing component 140 is not ready to process audio data 114 representing an utterance spoken in the second language 160(2). Accordingly, the HEC 138 may reject the connection request 212 from the HP 134 by sending rejection data 214 indicating that the local speech processing component 140 is not ready to process user speech in the language associated with the requesting HP 134. The language associated with the requested HP 134 may be determined from the language data that the HP 134 sent with the connection request 212. For instance, the HP 134 may send the connection request 134 with language data indicating that the HP 134 is now associated with, and the speech interface device 102 is thereby operable to process audio data representing an utterance in, the second language 160(2). However, in the example of FIG. 2, the language model(s) 150 for the second language 160(2) have not been loaded to volatile memory of the speech interface device 102 at the time the connection request 212 is received by the HEC 138, so the HEC 138 may send rejection data 214 (e.g., a "clientRejected (Engine_Not_Ready)" rejection 214) that indicates the reason for the rejection; namely, the local speech processing component 140 is not ready to process user speech in the second language 160(2). The purpose of the HP-to-HEC handshake is to ensure that the HEC 138 will be able to fulfill a future request from the HP in terms of processing audio data 114 to respond to user speech. In some embodiments, the speech interface device 102 (e.g., the HEC 138 executing on the speech interface device 102) may advertise its supported languages to all HP components known to the speech interface device 102, which can include additional HP components of other speech interface devices, in addition to the HP 134 executing on the speech interface device 102 itself.

In some cases, the HEC 138 may send metadata along with the rejection data 214, the metadata informing the HP 134 as to whether the HP 134 should periodically retry to connect with the HEC 138. This may be the case when a language update is in progress for the second language 160(2) spoken in the second locale, which means that the second language 160(2) will eventually be supported once the language update is complete and the language model(s) 150 for the second language 160(2) are loaded to volatile memory of the speech interface device 102. Until then, the local speech processing component 140 of the speech interface device 102 is not ready to process audio data 114 representing utterances spoken in the second language 160 (2) because the language model(s) 150 for that language is/are still downloading and/or loading. The metadata received in a rejection 214 can, for example, include a Boolean value (e.g., an "isRetryable" bit or flag) that is set to "true" or "false," depending on the language data associated with the requesting HP 134. For instance, the isRetryable bit may be set to a value of "true" if the language data associated with the HP 134—and received in the handshake procedure—indicates that the HP 134 is associated with the second language 160(2) because the speech interface device 102 will eventually be able to support the HP 134 in terms of processing speech in the second language 160(2). On the other hand, for a HP that sends language data indicating that the HP is associated with an unsupported language 160 (unsupported locale), the isRetryable bit may be set to a value of "false" to indicate to the HP 134 that it should not retry to connect with the HEC 138. Although the HP 234 may also retry to connect with the HEC 138 at, or near, the same time as the connection request 212 from the HP 134, FIG. 2 does not illustrate an immediate connection request from the HP 234 to simplify the Figure.

Meanwhile, the artifact manager 146—having sent the event data 204 to the local speech processing component 140 to initiate the language change process—may, at 216, begin to download one or more language models 150 associated with the second language 160(2) spoken in the second locale to non-volatile memory of the speech interface device. Non-volatile memory may include any suitable local storage on the device 102 that persistently stores data. Accordingly, non-volatile memory where artifacts are downloaded is sometimes referred to as "persistent storage," and may include, without limitation, spinning disk media, solid state storage drives, or any other suitable type of non-volatile memory. It is to be appreciated that the artifact manager 146 may also delete, from the non-volatile memory of the speech interface device 102, the language model(s) 150 (and other data, such as voice prompt data, language transformation data, TTS models, skill prompt data, etc.) associated with the first language 160(1) that have been unloaded from the local speech processing component 140. This deletion of one or more existing language models 150 may be done prior to downloading one or more new language models 150, or it may be done after starting or completing the download of the new language model(s) 150. Deleting language models 150 prior to downloading new language models 150 may free up memory resources on a resource-constrained device 102. Downloading one or more new language models 150 may involve sending, to the remote system 116 (e.g., to the locale-specific artifact download system 168), a download request for data that is usable by the local speech processing component 140 to process audio data 114 representing an utterance spoken in the second language 160(2), and receiving, from the remote system 116 based at least in part on the download request, the one or more language models 150 associated with the second language 160(2). Additional artifacts or data—such as voice prompt data (e.g., canned voice prompts (e.g., audio files) that are output when a language update is in progress), TTS models (e.g., used to synthesize speech from text), skill prompt data, locale-specific settings, locale-specific configuration files, language transformation data for string manipulations (e.g., making words plural, etc.), etc.—that is usable by various components of the speech interface device 102 to respond to detected utterances may be received along with the language model(s) 150 based on the download request. For example, voice prompt data may be received from the remote system 116 as part of the download at 216. This voice prompt data may be associated with the second language 160(2) as well, such as by including files that can be processed in order to output voice prompts via a speaker(s) of the speech interface device 102 in the second language 160(2), even while the language model(s) 150 for the second language 150 are still being loaded and/or downloaded. Accordingly, smaller files, such as voice prompt data, may be received and stored at the speech interface device 102 before downloading the larger-sized language model(s) 150, which can ensure that voice prompts are available to output while the language model(s) 150 are still downloading. It is to be appreciated that the artifact manager 146 may not have to download the language model(s) 150 for the second language 160(2) in a scenario where the language model(s) 150 are already stored in the non-volatile memory (e.g., on local storage) of the speech interface device 102. In these embodiments, the local speech processing component 140 may retrieve the language model(s) 150 for the second language 160(2) from the non-volatile memory of, or accessible to, the speech interface device 102, without downloading language models over a wide area network.

In some embodiments, a new language model(s) 150 may be downloaded to an intermediate device, such as the user device 120, over a wide area network 118, and then the language models 150 may be transferred from the intermediate device (e.g., the user device 120) to the speech interface device 102 over a local area network (e.g., via a WiFi access point (AP)) for storage in the non-volatile memory of the speech interface device 102. Downloading models 150 to an intermediate device and then transferring the models 150 to the speech interface device 102 can be done in an automotive implementation where the speech interface device 102 is implemented in a vehicle, for example. A user 104 can request to change the language setting of the speech interface device 102 in his/her vehicle while in the user's 104 home, the language model(s) 150 for the new language spoken in the new locale can be downloaded to the user's 104 phone (i.e., user device 120) over the Internet, and then, when the user 104 enters the vehicle, the user's 104 phone can automatically transfer the language model(s) 150 to the speech interface device 102 in the vehicle over a WiFi AP of the vehicle.

With reference again to FIG. 2, in response to downloading the language model(s) 150 (and possibly additional data) at 216, the artifact manager 146 may send event data 218 (e.g., a "onData(locale, modelPath)" event 218) to the local speech processing component 140. The event data 218 received by the local speech processing component 140 may inform the local speech processing component 140 regarding the location, in the non-volatile memory of the speech interface device 102, where the new model(s) 150 have been stored so that the local speech processing component 140 can load the new model(s) 150 from the non-volatile memory to volatile memory of the speech interface device 102.

At 220, the local speech processing component 140 may load, from the non-volatile memory of the speech interface device 102, to volatile memory of the speech interface device 102, the language model(s) 150 associated with the second language 160(2). Here, volatile memory may include any suitable form of volatile memory, such as, without limitation, volatile RAM, dynamic RAM (DRAM), or the like, which is suitable for temporarily storing data until it is used, transmitted, deleted, and/or stored persistently. The local speech processing component 140 may use information in the event data 218 to determine where (e.g., a memory address, file folder, etc.) to retrieve the language model(s) 150 from. Loading the language model(s) 150 at 220 may occur during the download of the language model(s) 150, in some embodiments, or after the download is complete.

Once the language model(s) 150 is/are loaded to volatile memory of the speech interface device 102, the state variable of the local speech processing component 140 may be changed from the second value (e.g., isReady=false) to the first value (e.g., isReady=true) to indicate that the language update is complete and that the local speech processing component 140 is ready to process audio data 114 representing an utterance spoken in the second language 160(2). The local speech processing component 140 may also send event data 222 to the LRO 142, which may include second status data 208(2) indicating that the language update is complete (e.g., engineLocale==deviceLocale) and that the state variable of the local speech processing component 140 has been set to the first value (e.g., isReady=true). The LRO 142 may, in turn, send the event data 222 to the HEC 138. This event data 222 received by the HEC 138 may also include the second status data 208(2) indicating, to the HEC 138, that the language update is complete (e.g., engineLocale deviceLocale) and that the state variable of the local speech processing component 140 has been set to the first value (e.g., isReady=true), which means that the local speech processing component 140 is ready to process audio data 114 representing an utterance spoken in the second language 160(2). At this point in time, the HEC 138 no longer rejects connection requests from HP components due to the ready status of the local speech processing component 140. However, a connection request from a HP may still be rejected after the HEC 138 receives the event data 222, if, for example, the HP is associated with a language spoken in a locale that is not supported by the speech interface device 102.

As shown in FIG. 2, for example, the second HP 234 executing on a second speech interface device 106 may send second connection request data 224 (e.g., an "initialize" request 224, or a connection request 224) to the HEC 138, the second connection request 224 including at least second language data indicating that the second HP 234 is associated with a different language than the second/new language. For example, FIG. 2 shows a "ReportDeviceIdentification (locale: en_US) event 226 that is sent from the HP 234 to the HEC 138 (e.g., over a local area network), which may be included in the connection request 224 or sent separately from the connection request 224, and which specifies the first language 160(1) (e.g., English) spoken in the first locale (e.g., the United States) as its associated language. The HEC 138 may compare this language data received from the HP 234 to the language data specified in the current language setting of the speech interface device 102 to determine that the language setting of the speech interface device 102 is set to the second language 160(2), and that the language/locale associated with the HP 234 does not match the second language/locale of the speech interface device 102 (referred to herein as a "language mismatch" or a "locale mismatch").

Based on at least some of the data (e.g., based at least in part on the language data) exchanged during the handshake procedure with the HP 234, the HEC 138 can determine whether to accept or reject the connection request from the HP 234. In this case, the HEC 138 may reject the HP's 234 connection request 224 by sending rejection data 228 (e.g., a "clientRejected (Locale_Mismatch)" rejection 228) that indicates the reason for the rejection; namely, the language associated with the HP 234 does not match the language associated with the speech interface device 102, which, in this example, is the second language 160(2).

FIG. 2 also shows that the HP 134 executing on the speech interface device 102 may try to connect with the HEC 138 again (e.g., after a period of time) by sending connection request data 230 (e.g., an "initialize" request 230, or a connection request 230) to the HEC 138. Retrying to connect with the HEC 138 may be based on the receipt of metadata in the previous rejection data 214 that included the Boolean value (e.g., an "isRetryable" bit or flag) set to "true," which indicated to the HP 134 that it should try to connect with the HEC 138 a second time. Hence, the HP 134 tries to connect a second time by sending the connection request 230, and the second connection request 230 may include at least the language data indicating that the HP 134 is associated with the second locale (e.g., Deutschland) where the second language 160(2) (e.g., Deutsch) is spoken. For example, FIG. 2 shows a "ReportDeviceIdentification (locale: de_DE) event 232 that is sent from the HP 134 to the HEC 138, which may be included in the connection request 230 or sent separately from the connection request 230, and which specifies the second language 160(2) (e.g., Deutsch) spoken in the second locale (e.g., Deutschland) as its associated language. The HEC 138 may compare this language data received from the HP 134 to the language data specified in the current language setting of the speech interface device 102 to determine that the language setting of the speech interface device 102 is set to the second language 160(2), and that the language/locale associated with the HP 134 matches the second language/locale of the speech interface device 102 (referred to herein as a "language match" or a "locale match").

Based on at least some of the data (e.g., based at least in part on the language data) exchanged during the handshake procedure with the HP 134, the HEC 138 can determine whether to accept or reject the connection request from the HP 134. In this case, the HEC 138 may accept the HP's 134 connection request 230 by sending acceptance data 236 (e.g., a "clientAccepted" event 236) that indicates the HEC 138 accepts the connection request 230 from the HP 134 based on the language data received from the HP 134 indicating that the HP's 134 language/locale matches the language/locale of the speech interface device 102.

After accepting the connection request 230, an interaction between a user 104 and the speech interface device 102 may start, and the HP 134 may send event data 238 (e.g., a "RecongizeEvent" 238) to the HEC 138 in response. For example, the user 104 may have uttered a phrase in German/Deutsch that translates to English as "Alexa, turn off the kitchen lights" to start an interaction. The HP 134 may also receive audio data 114 representing the utterance spoken in the second language 160(2) (e.g., Deutsch), and this audio data 114 may sent to the HEC 138, which may forward the audio data 114 to the LRO 142 along with the event data 238. The HP 134 may also send the audio data 114 to the remote speech processing system 122 in parallel to see if remote directive data is received. The LRO 142 may provide the audio data 114 as input to the local speech processing component 140, and the local speech processing component 140 may receive the audio data 114 as input. For example, the audio data 114 representing the user speech in the second language 160(2) can be input to the ASR component 152. This may include sequentially inputting audio data samples to the ASR component 152, the ASR component 152 may perform ASR processing on the audio data 114 (e.g., audio data sample(s)) it receives from the LRO 142 (or a streaming thread invoked by the LRO 142), and the ASR component 152 may generate ASR data (e.g., text data). The ASR data (e.g., text data) is input to the NLU component 154, and the NLU component 154 performs NLU processing on the ASR data (e.g., text data) to generate NLU data. These subcomponents of the local speech processing component 140 may utilize the language model(s) 150 associated with the second language 160(2) spoken in the second locale, which were previously loaded by the local speech processing component 140 as part of the language update.

The NLU data 240 (e.g., "BIF") may be sent to the LRO 142, and the LRO 142 may send a "ReadyToExecute" event 242 to the HEC 138, letting the HEC 138 know that the NLU component 154 has recognized an intent (e.g., intent data generated as part of the NLU data 240), and that it is ready to execute on the intent by generating directive data. The HEC 138 may forward the "ReadyToExecute" event 242 to the HP 134, and the HP 134, after determining to use local directive data, may send an "Execute" event 244 to the HEC 138, and the HEC 138 may forward the "Execute" event 244 to the LRO 142, which communicates with the skills execution component 144 to invoke a skill and generate directive data that is processed to cause the speech interface device to perform an action (e.g., to send control data to a second device, such as the kitchen lights to turn off the kitchen lights). The skill invocation at 246 may involve finding a skill that matches the second locale (where the second language 160(2) is spoken) and the intent data generated by the NLU component 154. For example, skills may register themselves for what locale(s) and/or language they support and for what intents they support in each supported locale and/or language. This allows skills to support a first set of intents in a first language 160(1) (e.g., English), and a second set of intents in a second language 160(2) (e.g., Deutsch). Said another way, skills can declare which languages/locales they support, and they can have different levels of support for each language/locale. Designers of skills have the option to program skills to operate differently in different languages 160. In some embodiments, the local speech processing component 140 may send, along with the NLU data 240 to the LRO 142, data indicating the locale associated with the utterance represented by the processed audio data 114. For example, if audio data 114 representing an utterance spoken in U.S. English was processed by the local speech processing component 140 using language models 150 associated with U.S. English—which, in turn, resulted in a recognized intent, then the local speech processing component 140 may indicate to the LRO 142 that the recognized locale is "U.S. English." This indication of the recognized locale may allow for invoking the skills execution component 144 and/or the local TTS synthesis component 156 using the appropriate locale. That is, audible responses (e.g., skill prompts and other voice prompts) may be output to the user 104 in the same language in which the user 104 spoke to the speech interface device 102.

Notably, the technique of setting a language setting of a speech interface device 102 to a new language 160 spoken in a new locale enables the speech interface device 102 to process speech in various spoken languages, even in instances when a remote system 116—which, when available, can be used for processing user speech remotely—is, for example, unavailable to, slower than (with network-related latency factored in), or otherwise less preferred than the speech interface device 102. This means that the speech interface device 102 is able to process speech in a particular language (e.g., the second language 160(2)), even if the speech interface device 102 is unable to get a response from a remote speech processing system 122. This ability to support "offline" speech processing in a desired spoken language improves the user experience with the speech interface device 102. In addition, a user's expectations can be managed (e.g., through the use of voice prompts in the spoken language to which the device is switching) while a language update is in progress on the speech interface device. For instance, if an utterance in the second language 160(2) was detected after the HEC 138 received the event data 204 and before the HEC 138 received the event data 222 in FIG. 2, the speech interface device 102 may be configured to output a voice prompt in the second language 160(2) that, when translated to English, tells the user 104 something like: "a language update is in progress, please try again later."

Figure 3:
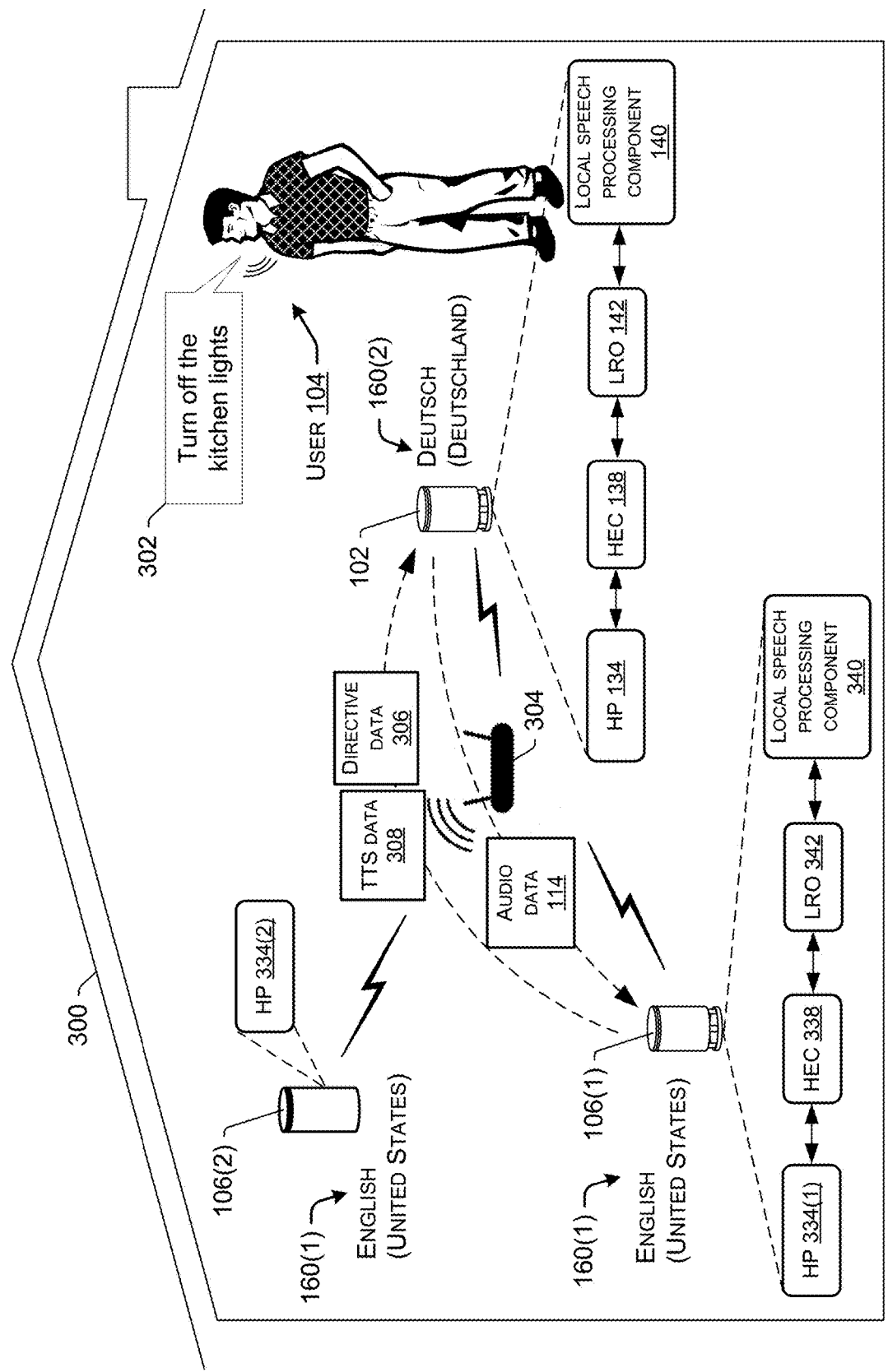
FIG. 3 is a diagram illustrating an example environment where multiple speech interface devices are collocated, and a technique for pairs of speech interface devices to exchange data at runtime in order to process an utterance spoken in a language of a language that is supported by at least one of the speech interface devices.

FIG. 3 is a diagram illustrating an example environment 300 (e.g., a house) where multiple speech interface devices are collocated, and a technique for pairs of speech interface devices to exchange data at runtime in order to process an utterance spoken in a language of a locale that is supported by at least one of the speech interface devices. In the example of FIG. 3, the speech interface device 102 is collocated in the environment 300 with a second speech interface device 106(1) and a third speech interface device 106(2). Furthermore, the language setting of the speech interface device 102 is set to a second language 160(2) (e.g., Deutsch) spoken in a second locale (e.g., Deutschland), while the second speech interface device 106(1) and the third speech interface device 106(3) have respective language settings that are each set to a first language 160(1) (e.g., English) spoken in a first locale (e.g., the United States).

The user 104 is shown as speaking an utterance 302 in the first language 160(1) (e.g., English) spoken in the first locale (e.g., the United States), such as the phrase "Turn off the kitchen lights." One or more of the speech interface devices in the environment 300 may detect the utterance 302 via their respective microphones. In the example, consider a case where at least the speech interface device 102 captures the utterance 302 with the microphone(s) 108 of the speech interface device 102, and generates audio data 114 based on the utterance 302. The audio data 114 may be received by the HP 134 executing on the speech interface device 102, and the HP 134 may send the audio data 114 to the remote speech processing system 122 via a wireless access point (WAP) 304 in the environment 300, which may be connected to the network 118 shown in FIG. 1. The HP 134 may also send the audio data 114 to the HEC 138, which sends the audio data 114 to the LRO 142, and the local speech processing component 140 may ultimately receive the audio data 114 where the audio data 114 may be run through ASR processing and NLU processing to generate intent data (or failure data if an intent is not recognized by the NLU component 154). In the example of FIG. 3, because the language setting of the speech interface device 102 is presently set to the second language 160(2) (e.g., Deutsch) spoken in the second locale (e.g., Deutschland), the NLU component 154 is likely to generate failure data based on the audio data 114 that represents an utterance spoken in the first language 160(1). This failure data indicates a failure to recognize an intent based on the audio data 114.

In response to failing to recognize an intent, the speech interface device 102 may be configured to send the audio data 114 to another speech interface device collocated in the environment 300. In this example, the second speech interface device 106(1) may include its own HP 334(1), its own HEC 338, its own LRO 342, and its own local speech processing component 340. As such, the audio data 114 may be sent from the speech interface device 102 to the second speech interface device 102 via the WAP 304, whereby local speech processing ensues on the second speech interface device 106(1) in a similar manner, except that the second speech interface device 106(1) may utilize language model(s) 150 associated with the first language 160(1) because its language setting is set to the first language 160(1). Accordingly, the local speech processing component 340 executing on the second speech interface device 106(1) may generate a NLU result that includes a recognized intent, and a skill execution component of the second speech interface device 106(1) may process the intent data to invoke a skill (e.g., a skill specific to the first language 160(1) spoken in the first locale). The second speech interface device 106(1) may generate directive data 306 and TTS data 308 that may be sent back to the speech interface device 102, the directive data 306 usable for performing a corresponding action to fulfill the intent (e.g., turning off the kitchen lights), and the TTS data 308 usable for outputting synthesized speech in the first language 160(1) via a speaker(s) of the speech interface device 102. In some embodiments, at least the directive data 306 may be sent to a third speech interface device 106(2) for performing the corresponding action to fulfill the intent, such as when the third speech interface device 106(2) is paired with the device that is to be controlled, for example. Alternatively, the second speech interface device 106(1) may perform the action itself based on directive data. The speech interface device 102 may determine to send audio data 114 to the second speech interface device 106(1) in lieu of sending the audio data 114 to the third speech interface device 106(2) based on some prior knowledge of those devices' capabilities. For instance, the third speech interface device 106(2) may not have the components for performing local speech processing, and this may be known to the speech interface device 102. For instance, the third speech interface device 106(2) may have a HP 334(2) for routing audio data 114 to other systems/devices that perform speech processing as a service to the third speech interface device 106(2), but it may omit a local speech processing component, for example.

Thus, FIG. 3 illustrates how a user 104 may employ multiple speech interface devices in an environment 300 to potentially process user speech locally in the environment in any spoken language that is supported by at least one of the speech interface devices 102 with local speech processing capabilities. Similarly, and as mentioned, if a speech interface device has sufficient local resources (e.g., memory resources, processing resources, etc.) to have language models 150 associated with multiple languages spoken in multiple locales simultaneously loaded, a single speech interface device 102 may process audio data 114 locally by utilizing multiple locale-specific language models 150 serially or in parallel, generating intent data using each locale-specific language model 150, and determining to use intent data that scores the highest, for example (e.g., based on a confidence score associated with the intent data). It may be the case that using one locale-specific language model(s) 150 to process audio data 114 results in a failure to recognize an intent, while using another locale-specific language model(s) 150 to process the audio data 114 results in a recognized intent, and the intent data for the recognized intent may be used to generate directive data to cause the speech interface device 102 to perform an action. In some embodiments, the speech interface device 102 shown in FIG. 3 may send audio data 114 to the second speech interface device 106(1) before locally processing the audio data 114 through its own local speech processing component 140. In this manner, the second speech interface device 106(1) can be used as a backup in the event that the local speech processing component 140 of the speech interface device 102 fails to recognize an intent, which may reduce latency as compared to waiting until a failure to recognize an intent before sending the audio data 114 to the second speech interface device 106(1).

The scenario shown in FIG. 3 (e.g., multiple speech interface devices in an environment 300 that are set to different spoken languages) may be possible due to the fact that a user 104 can request to set a language setting on a per-device basis. For instance, the user 104 may intentionally desire to have different areas (e.g., rooms) of the environment 300 designated for different spoken languages (e.g., upstairs—English, downstairs—Deutsch). In any case, the HP 334(2) may perform the handshake process with both the HEC 138 of the speech interface device 102 and the HEC 338 of the second speech interface device 106(1), and the HP 334(2) may end up connected to the HEC 338 due to the locale match between the devices 106(1) and 106(2), and disconnected from the HEC 138 due to the locale mismatch between the devices 106(2) and 102. Thus, if the third speech interface device 106(2) were to detect an utterance, the HP 334(2) may, in addition to sending the audio data 114 representing the utterance to the remote speech processing system 122, send the audio data 114 to the second speech interface device 106(1) for local speech processing on the second speech interface device 106(1).

Figure 4:
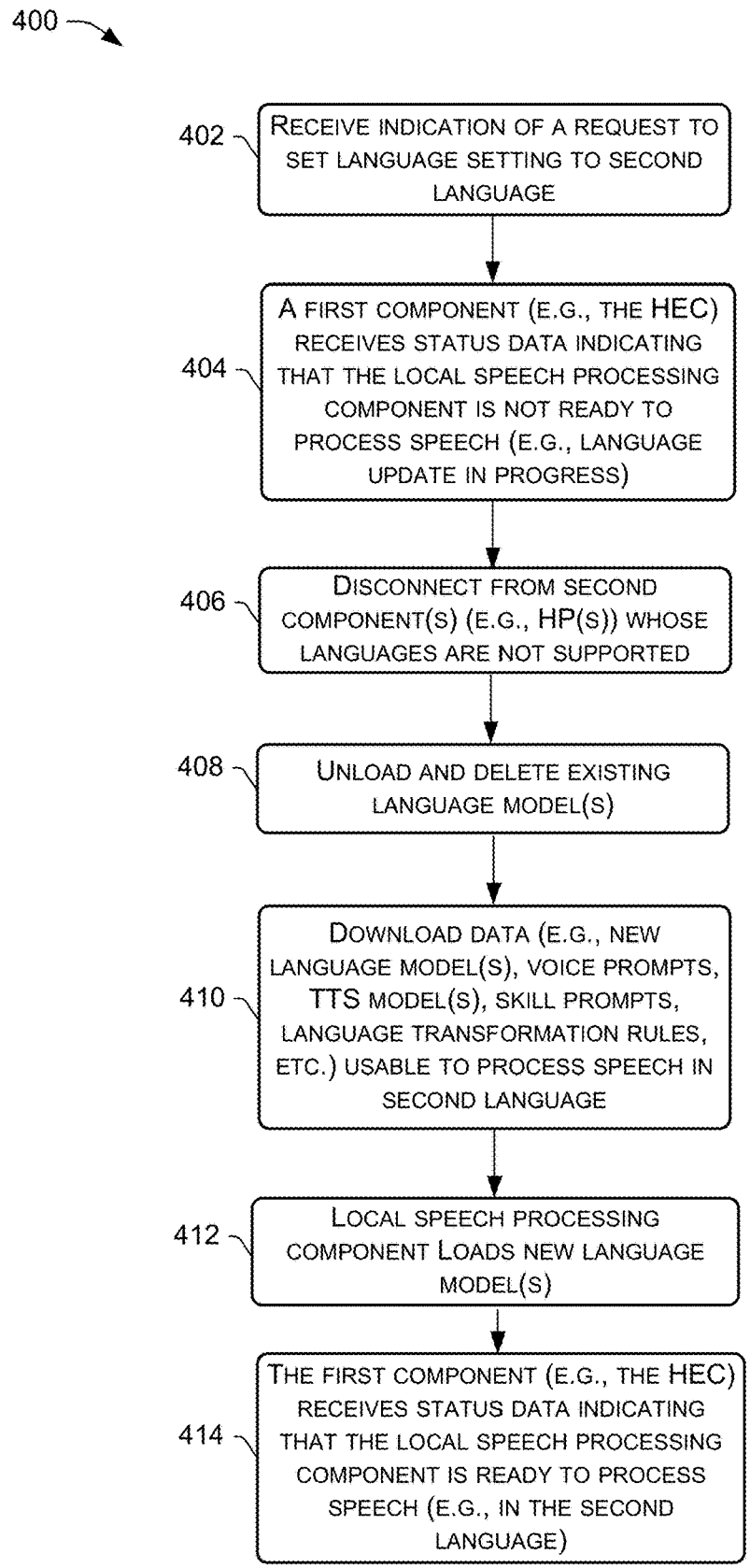
FIG. 4 is a flow diagram of an example process implemented by a speech interface device for switching to a new locale in order to locally process utterances spoken in the language of the new locale.

FIG. 4 is a flow diagram of an example process 400 implemented by a speech interface device 102 for switching to a new locale in order to locally process utterances spoken in the language of the new locale. For discussion purposes, the process 400 is described with reference to the previous figures.

At 402, a speech interface device 102 having a language setting set to a first language 160(1) (e.g., English)—which may be spoken in a first locale (e.g., the United States)—may receive an indication of a request to set the language setting of the speech interface device 102 to a second language 160(2) (e.g., Deutsch)—which may be spoken in a second locale (e.g., Deutschland). This request may be initiated by a user 104 using a companion application (or "app") or a website accessed via a user device, such as the user device 120, as shown in FIG. 1, and selecting the second language 160(2) spoken in the second locale. The companion application may send data to the remote system 116, which may, in turn, send data to the speech interface device 102 to notify the speech interface device 102 of the request. Alternatively, the user device 120 may be configured to send data directly to the speech interface device 102 via a local area network.

At 404, a first component of (e.g., executing on) the speech interface device 102, such as the HEC 138, may receive first status data 208(1) indicating that a language update is in progress, and/or indicating that a state variable of the local speech processing component 140 is set to the a second value of two possible values indicating that the local speech processing component 140 is currently unable (e.g., not ready) to process audio data 114 representing an utterance spoken in a particular language (e.g., the second language 160(2)). For instance, in response to receiving the indication of the request at block 402, a state variable of the local speech processing component 140 executing on the speech interface device 102 may be changed from a first value (e.g., isReady=true) to a second value (e.g., isReady=false), where the second value indicates that a language update is in progress and/or that the local speech processing component 140 is currently unable (e.g., not ready) to process audio data 114 representing an utterance spoken in a particular language (e.g., the second language 160(2)).

At 406, the first component (e.g., the HEC 138) may disconnect from one or more second components, such as one or more HP components, in response to receiving the first status data 208(1). For example, the first component (e.g., the HEC 138) may, based on a policy, send a disconnection instruction 210(1) to a second component (e.g., the HP 134 executing on the speech interface device 102) to disconnect from the second component (e.g., the HP 134). This may be based at least in part on the second component (e.g., the HP 134) being associated with an unsupported language (e.g., if the HP 134 is associated with the first language 160(1)). The first language 160(1) may be unsupported because a language update is now in progress and the language model(s) 150 associated with the first language 160(1) (e.g., spoken in the first locale) are being unloaded and deleted from memory of the device 102. In some embodiments, the disconnection from the second component (e.g., the HP 134) is based on the language setting being updated to a new language, regardless of the language associated with the second component (e.g., the HP 134).

At 408, the local speech processing component 140 may unload, from volatile memory of the speech interface device 102, existing language model(s) 150 (e.g., one or more ASR models, one or more NLU models, etc.) associated with the first language 160(1), and the artifact manager 146 may delete, from non-volatile memory of the speech interface device 102, the language model(s) 150 associated with the first language 160(1), as well as TTS models, skill prompt data, voice prompt data, and possibly other data that is associated with the first language 160(1). In some embodiments, depending on how resource-constrained the speech interface device 102 is, block 408 may be omitted, such as when there are sufficient local resources to load and run audio data 114 through multiple locale-specific language model(s) 150 at runtime, and/or to keep TTS models, skill prompts, and/or voice prompts available in multiple languages.

At 410, the artifact manager 146 may download, to the non-volatile memory of the speech interface device 102, data usable to process speech in the second language 160(2) spoken in the second locale. This downloaded data may include language model(s) 150 (e.g., ASR models, NLU models, etc.) associated with the second language 160(2). The downloaded data may further include voice prompt data that can be processed locally to output voice prompts in the second language 160(2), as well as one or more TTS models (e.g., used to synthesize speech in the second language 160(2) from text), skill prompt data (e.g., text data in the second language 160(2) that can be processed by the local TTS synthesis component 156 as a skill prompt output to the user 104 when a skill is invoked), locale-specific settings, locale-specific configuration files, language transformation data (e.g., language transformation rules) that allow for string manipulation operations on ASR data that is generated from the audio data 114 representing an utterance spoken in the second language 160(2), etc. The downloading at block 410 may include sending, to a remote system 116, a download request for data that is usable by the local speech processing component 140 to process audio data 114 representing an utterance spoken in the second language 160(2), receiving, from the remote system 116 based at least in part on the download request, data (e.g., the language model(s) 150, voice prompt data, etc.) associated with the second language 160(2), and storing, in the memory of the speech interface device 102, the data (e.g., the language model(s) 150, the voice prompt data, etc.) associated with the second language 160(2). It is to be appreciated that the speech interface device 102 may not have to download new language models 150 when, for example, those language models 150 are already stored in memory (e.g., on disk) of the speech interface device 102. In this case, the local speech processing component 140 may retrieve the language model(s) 150 associated with the second language 160(2) from memory instead of the artifact manager 146 downloading those models 150 at block 410.

At 412, the local speech processing component 140 may load, from the non-volatile memory of the speech interface device 102, to the volatile memory of the speech interface device 102, the language model(s) 150 associated with the second language 160(2). Loading the language model(s) 150 at block 412 may enable the local speech processing component 140 to process audio data 114 representing an utterance spoken in the second language 160(2). Other artifacts or data may be loaded to volatile memory as well, such as TTS models, skill prompt data, and/or other voice prompt data associated with the second language 160(2) spoken in the second locale.

At 414, the first component (e.g., the HEC 138), may receive second status data 208(2) indicating that the language update is complete and/or indicating that the local speech processing component 140 is ready to process the audio data 114 representing an utterance spoken in the second language 160(2). This may be based on a change of the state variable of the local speech processing component 140 from the second value (e.g., isReady=false) back to the first value (e.g., isReady=true), the first value indicating that the language update is complete and/or the local speech processing component 140 is ready to process the audio data 114 representing an utterance spoken in the second language 160(2).

Figure 5:
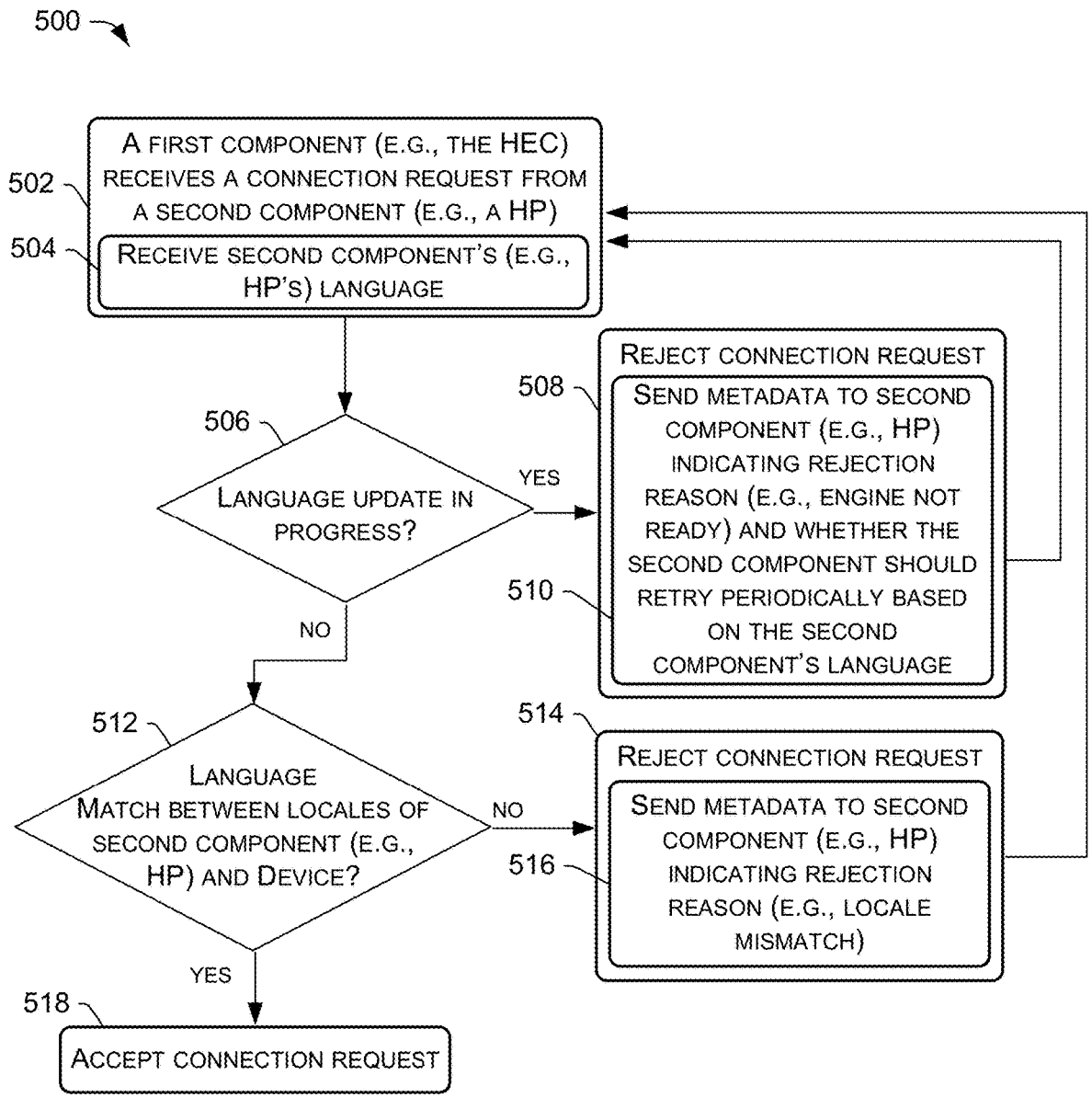
FIG. 5 is a flow diagram of an example process implemented by a speech interface device for managing a connection with a hybrid proxy (HP) component, wherein the connection management is based at least in part on a locale setting of the HP component.

FIG. 5 is a flow diagram of an example process 500 implemented by a speech interface device 102 for managing a connection with a hybrid proxy (HP) component, wherein the connection management is based at least in part on a locale setting of the HP component. For discussion purposes, the process 500 is described with reference to the previous figures.

At 502, a first component of (e.g., executing on) a speech interface device 102, such as the HEC 138, may receive a connection request from a second component (e.g., an HP component). This second component may be a HP component 134 executing on (or hosted by) the speech interface device 102, or a HP component 234 executing on (or hosted by) a second speech interface device 106. As shown by sub-block 504, the first component (e.g., the HEC 138) may receive, with the connection request, language data indicating that the second (e.g., HP) component is associated with a particular language.

At 506, a determination may be made as to whether a language update is in progress on the speech interface device 102. For example, the first component (e.g., the HEC 138), at some point in time prior to making the determination at block 506, may have received status data. This status data may indicate that a language update is in progress and/or that the local speech processing component 140 executing on the speech interface device 102 is currently unable (e.g., not ready) to process audio data 114 representing an utterance spoken in a particular language, or the status data may indicate that a language update is complete and/or that the local speech processing component 140 executing on the speech interface device 102 is ready to process audio data 114 representing an utterance spoken in a particular language. If the status data that was most recently received by the first component (e.g., the HEC 138) indicated that a language update is in progress and/or that the local speech processing component 140 of the speech interface device 102 is not ready to process audio data 114 representing an utterance spoken in a particular language (e.g., the second language 160(2), the process 500 may follow the "YES" route from block 506 to block 508.

At 508, the first component (e.g., the HEC 138) may reject the connection request. This rejection may be based at least in part on the in-progress language update, which may be determined from status data that the first component (e.g., the HEC 138) received previously.

At sub-block 510, the first component (e.g., the HEC 138) may send metadata to the requesting second (e.g., HP) component. This metadata may indicate a reason for rejecting the second component's (e.g., HP's) connection request. For example, if a language update is in progress and the state variable of the local speech processing component 140 of the speech interface device 102 is set to a value of isReady=false, the metadata may indicate that the reason for rejecting the connection request is that the local speech processing component 140 is not ready to process audio data 114 representing an utterance spoken in a particular language (e.g., Engine_Not_Ready). The metadata sent to the second component (e.g., HP component) at sub-block 510 may further indicate whether the second component (e.g., HP component) should retry connecting to the first component (e.g., the HEC 138) after a period of time (e.g., retry periodically), such as by setting a Boolean value (e.g., an "isRetryable" bit or flag) to "true" or "false," depending on the language data associated with the requesting second (e.g., HP) component. For instance, the isRetryable bit may be set to a value of "true" if the language data associated with the requesting second (e.g., HP) component indicates that the second (e.g., HP) component is associated with a language that the speech interface device 102 will eventually be able to support when the language update is complete. In this case, the metadata sent to the second (e.g., HP) component at sub-block 510 may indicate that the second (e.g., HP) component is to retry connecting to the first component (e.g., the HEC 138) after a period of time, and the process 500 returns to block 502 to await another connection request, such as from a HP.

If, at 506, the status data that was most recently received by the first component (e.g., the HEC 138) indicated that a language update is not in progress and/or that the local speech processing component 140 of the speech interface device 102 is ready to process audio data 114 representing an utterance spoken in a particular language (e.g., the second language 160(2)), the process 500 may follow the "NO" route from block 506 to block 512.

At 512, the first component (e.g., the HEC 138) may determine whether there is a language match (sometimes referred to as a "locale match") between the language associated with the requesting second (e.g., HP) component (as determined from the language data received at block 504) and the language associated with the speech interface device 102 hosting the first component (e.g., the HEC 138). If there is a language mismatch (such as when the first component (e.g., the HEC 138) determines that the language setting of the speech interface device 102 is set to the second language 160(2) and the language associated with the requesting second (e.g., HP) component is a different language, such as the first language 160(1)), then the process 500 may follow the "NO" route from block 512 to block 514.

At 514, the first component (e.g., the HEC 138) may reject the connection request. This rejection may be based at least in part on the language data received from the requesting second (e.g., HP) component at block 504, which, when compared to the language of the speech interface device 102, indicates a language mismatch. At sub-block 516, the first component (e.g., the HEC 138) may send metadata to the requesting second (e.g., HP) component. This metadata may indicate a reason for rejecting the second component's (e.g., HP's) connection request. For example, if a language mismatch was detected, the metadata may indicate that the reason for rejecting the connection request is that the requesting second component's (e.g., HP's) language does not match a language associated with the speech interface device 102, indicating that the speech interface device 102 cannot support the language associated with the requesting second (e.g., HP) component. The process 500 may then return to block 502 to await another connection request, such as from a HP.

If, at 512, the first component (e.g., the HEC 138) determines that there is a language match between the language associated with the requesting second (e.g., HP) component and the language associated with the speech interface device 102 hosting the first component (e.g., the HEC 138), the process 500 may follow the "YES" route from block 512 to block 518, where the first component (e.g., the HEC 138) may accept the connection request. As indicated by the process 500, accepting the connection request at block 518 is based at least in part on the status data indicating whether a language update is in progress and/or the ready status of the local speech processing component 140 of the speech interface device 102. Furthermore, accepting the connection request at block 518 is based at least in part on the language data received from the requesting second (e.g., HP) component at block 504. In other words, preconditions for accepting a connection request from a requesting second (e.g., HP) component are that the local speech processing component 140 is ready to process audio data 114 representing user speech, and that the speech interface device 102 supports a language that matches the requesting second (e.g., HP) component's language such that the speech interface device 102 can process audio data 114 received from the second (e.g., HP) component in the future.

Figure 6:
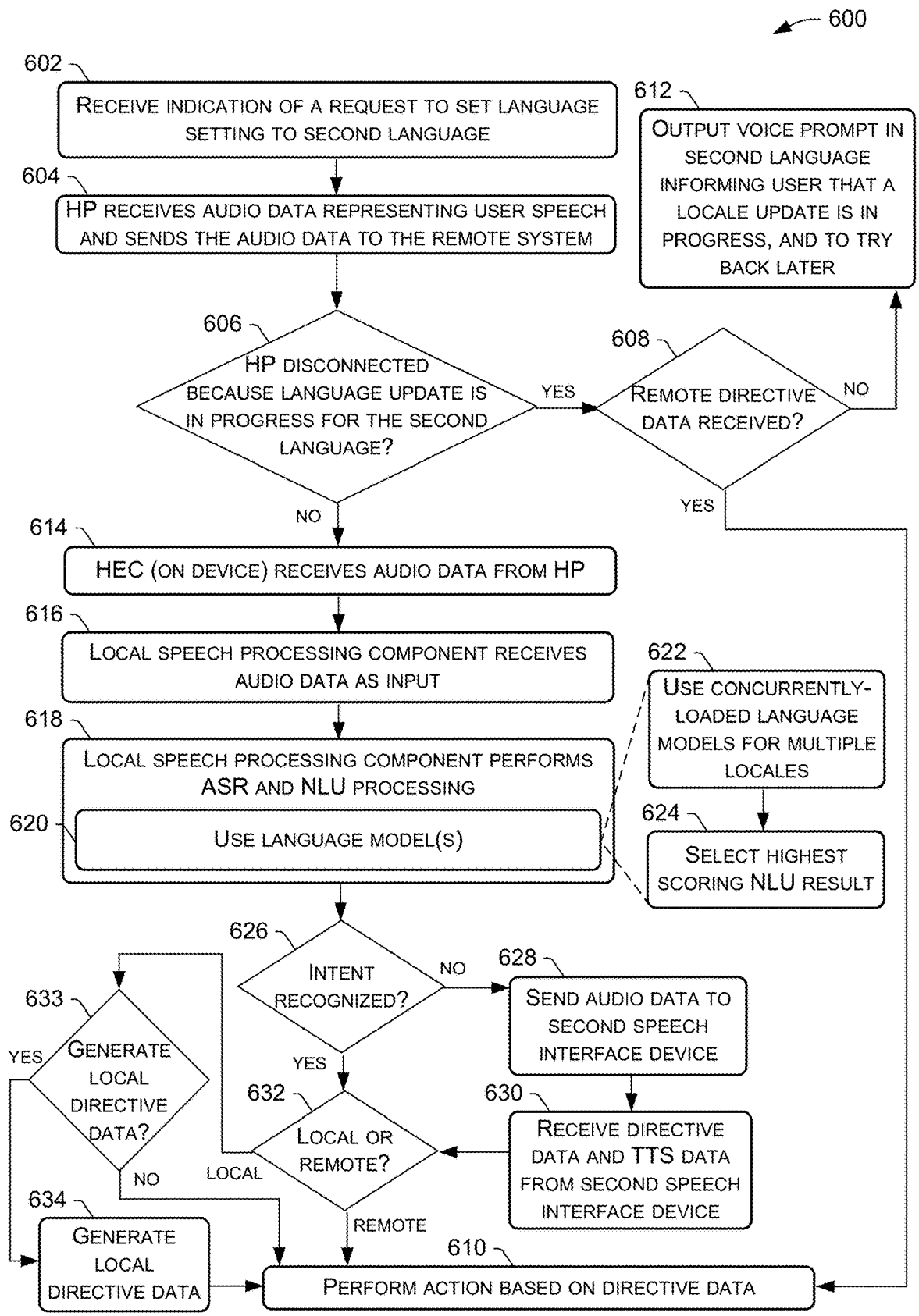
FIG. 6 is a flow diagram of an example process implemented by a speech interface device for processing user speech locally after a request has been received to set a language setting of a speech interface device to a new language.

FIG. 6 is a flow diagram of an example process 600 implemented by a speech interface device 102 for processing user speech locally after a request has been received to set a language setting of a speech interface device 102 to a new language. For discussion purposes, the process 600 is described with reference to the previous figures.

At 602, a speech interface device 102 having a language setting set to a first language 160(1) (e.g., English)—which may be spoken in a first locale (e.g., the United States)—may receive an indication of a request to set the language setting of the speech interface device 102 to a second language 160(2)—which may be spoken in a second locale. This request may be initiated by a user 104 using a companion application (or "app") or a website accessed via a user device, such as the user device 120, as shown in FIG. 1, and selecting the second language 160(2) spoken in the second locale. The companion application may send data to the remote system 116, which may, in turn, send data to the speech interface device 102 to notify the speech interface device 102 of the request. Alternatively, the user device 120 may be configured to send data directly to the speech interface device 102 via a local area network.

At 604, audio data 114 representing user speech (e.g., an utterance spoken in a particular language) may be received by a second component (e.g., the HP 134) of (e.g., executing on) the speech interface device 102. This audio data 114 may be received via the wakeword engine 124, the AFE 125, and the SIM 128. The second component (e.g., the HP 134) may also send the audio data 114 to the remote system 116 (e.g., to the remote speech processing system 122) at block 604.

At 606, a determination may be made as to whether the second component (e.g., the HP 134) is currently disconnected from a first component (e.g., the HEC 138) due to an in-progress language update for the second language 160(2). For example, the audio data 114 may be received while one or more language models 150 associated with the second language 160(2) are still being loaded and/or downloaded. If the second component (e.g., the HP 134) is disconnected from the first component (e.g., the HEC 138) for this reason, the process 600 may follow the "YES" route from block 606 to block 608, where the second component (e.g., the HP 134) determines whether remote directive data has been received from the remote system 116 (e.g., the remote speech processing system 122). If remote directive data is received (e.g., within a predefined time period), the process 600 may follow the "YES" route from block 608 to block 610, where the speech interface device 102 may perform an action based on the remote directive data (e.g., output an audible response via a speaker(s) of the speech interface device 102, output content (e.g., music) via the speaker(s), output content via a display(s) of the speech interface device 102, control a second device in the environment by sending control data to the second device, etc.).

If, at block 608, remote directive data is not received (e.g., if the speech interface device 102 is offline, the remote system 116 is slow to respond, etc.), the process 600 may follow the "NO" route from block 608 to block 612.

At 612, the speech interface device 102 may output, via an output device (e.g., speaker(s)) of the speech interface device 102, a voice prompt in the second language 160(2). The voice prompt may inform the user 104 who is interacting with the speech interface device 102 that a language update is in progress, and to try back later, or something similar. The logic to output a voice prompt in this scenario may be based at least in part on metadata that was received by the second component (e.g., the HP 134) in a rejection of its previous connection request. That is, the metadata received by the second component (e.g., the HP 134) may have included a reason for the rejection of the second component's (e.g., the HP's 134) connection request; namely, that the local speech processing component 140 is currently unable (e.g., not ready) to process audio data 114 representing an utterance spoken in the second language 160(2). The voice prompt may be output at block 612 based at least in part on the voice prompt data that is stored in memory of the speech interface device 102. For example, the artifact manager 146 may have downloaded the voice prompt data associated with the second language 160(2) before downloading the language model(s) 150 associated with the second language 160(2) so that the speech interface device 102 can respond to the user 104 with a voice prompt in the scenario illustrated in FIG. 6. This helps to manage the user's 104 expectations, instead of the speech interface device 102 not responding with an audible response, leaving the user 104 to wonder what is wrong. In addition, or in the alternative, to the voice prompt, the speech interface device 102 may provide other types of output, such as a visual indicator (e.g., illumination of a light element, such as a red ring flashing) to indicate that a language update is in progress. Alternatively to the voice prompt in the second language 160(2), the voice prompt can be output in the first language 160(1), until the language update is complete. In addition, the companion application executing on the user device 120 may include a notification that a language update is in progress, as an additional layer of notification to the user 104.

If, at 606, the second component (e.g., the HP 134) is not disconnected from the first component (e.g., the HEC 138), and, hence, is connected with the first component (e.g., the HEC 138), the process 600 may follow the "NO" route from block 606 to block 614, where the first component (e.g., the HEC 138) of (e.g., executing on) the speech interface device 102 may receive the audio data 114 from the second component (e.g., the HP 134).

At 616, the audio data 114 may be received as input to the local speech processing component 140 of (e.g., executing on) the speech interface device 102. The audio data 114 may include one or more audio data samples, each corresponding to at least part the utterance. The number of audio data samples that are created may depend on the amount of audio data 114 generated (e.g., the number of samples may depend on the number of bytes of audio data).

At 618, the local speech processing component 140 may perform operations to process the user speech locally. For example, the operations performed at block 618 can include ASR processing operations to generate text data (ASR data) based at least in part on the audio data 114, NLU processing operations to generate NLU data based at least in part on the text data (ASR data), etc. As another example, the local speech processing component 140 may input the audio data 114 to a deep neural network(s) that is configured to output NLU data that represents an interpretation of the user speech represented by the audio data 114.

At sub-block 620, the local speech processing component 140 may process the audio data 114 using one or more locale-specific language models 150. For example, after completing the language update to set the language setting of the speech interface device 102 to the second language 160(2) in fulfillment of the request at block 602, the local speech processing component 140 may have one or more language models 150 associated with the second language 160(2) loaded in order to process the audio data 114 representing an utterance spoken in the second language 160(2). If the speech interface device 102 is less resource constrained and is able to have language models 150 for multiple locales loaded at the same time, the local speech processing component 140 may use language models 150 associated with multiple different locales to process the audio data 114, as shown by way of example with sub-blocks 622 and 624.

At 622, the local speech processing component 140 may utilize concurrently-loaded language models 150 associated with multiple different locales to process the audio data 114 representing user speech. For example, at block 622, the local speech processing component 140 may process the audio data 114 using the one or more first language models 150 associated with the first language 160(1) to generate first intent data, and may also process the audio data 114 using the one more second language models 150 associated with the second language 160(2) to generate second intent data.

At 624, the local speech processing component 140 may determine to use the first intent data (NLU result) or the second intent data (NLU result) to generate directive data. The selection between the first intent data and the second intent data may be based on confidence scores generated for the first intent data and the second intent data (e.g., select the intent data associated with the highest score).

At 626, a determination may be made as to whether an intent was recognized by the local speech processing component 140 (e.g., by the NLU component 154). If an intent was not recognized, the NLU component 154 may generate failure data indicating a failure to recognize an intent based on the audio data 114, and the process 600 may follow the "NO" route from block 626 to block 628.

At 628, the speech interface device 102 may send the audio data 114 to a second speech interface device, such as a second speech interface device 106 collocated in an environment with the speech interface device 106. For example, the audio data 114 can be sent via the communications interface 112 of the speech interface device 102, over a local area network (e.g., via a wireless access point 304) to the second speech interface device 106. Although FIG. 6 indicates that the audio data 114 can be sent to the second speech interface device 106 in response to the NLU component 154 generating failure data indicating a failure to recognize an intent, in order to reduce latency of processing an utterance, the speech interface device 102 may send the audio data 114 to the second speech interface device 106 earlier, such as before block 614, or between block 614 and block 626. In this manner, multiple speech interface devices that are collocated in an environment can process audio data representing an utterance, more or less in parallel.

At 630, the speech interface device 102 may receive directive data 306 and TTS data 308 from the second speech interface device 106, such as via the communications interface 112 of the speech interface device 102. From block 630, the process 600 may proceed to block 632, where the logic (e.g., the HP 134 or the HEC 138) of the speech interface device 102 may determine whether to use local directive data or remote directive data. Another path to block 632 is directly from block 626, where blocks 628 and 630 may be bypassed (omitted). For example, if, at 626, an intent is recognized by the NLU component 154 of the speech interface device 102, the process 600 may follow the "YES" route from block 626 to block 632.

At 632, various factors may be considered in making a determination as to whether to use local directive data or remote directive data. For instance, if remote directive data is not received at all, the logic may determine to use local directive data. However, there may be other factors that are considered in the determination at block 632, such as whether a local response is preferred in the particular scenario. In any case, if the logic chooses to use local directive data to respond to the user speech, the process 600 may follow the "LOCAL" route from block 632 to block 633, where a determination is made as to whether local directive data is to be generated. For example, if the process 600 followed the "YES" route from block 626 to block 632, the determination at block 633 may be that local directive data is to be generated. If local directive data is to be generated, the process 600 may follow the "YES" route from block 633 to block 634, where the skills execution component 144 may invoke a skill generate directive data (i.e., local directive data) based at least in part on the audio data 114 and the language model(s) 150 associated with the second language 160(2). If, on the other hand, it is determined that local directive data does not need to be generated (e.g., if local directive data is received from a second speech interface device 106 in the environment, such as by traversing blocks 628 and 630 of the process 600), the process 600 may follow the "NO" route from block 633 to block 610. Accordingly, following block 633 or 634, the speech interface device 102 may, at block 610, perform an action based at least in part on the local directive data.

If, at 632, the logic chooses to use remote directive data (assuming remote directive data is received before a timeout), the process 600 may follow the "REMOTE" route from block 632 to block 610, where the speech interface device 102 may perform an action based at least in part on the remote directive data.

Figure 7:
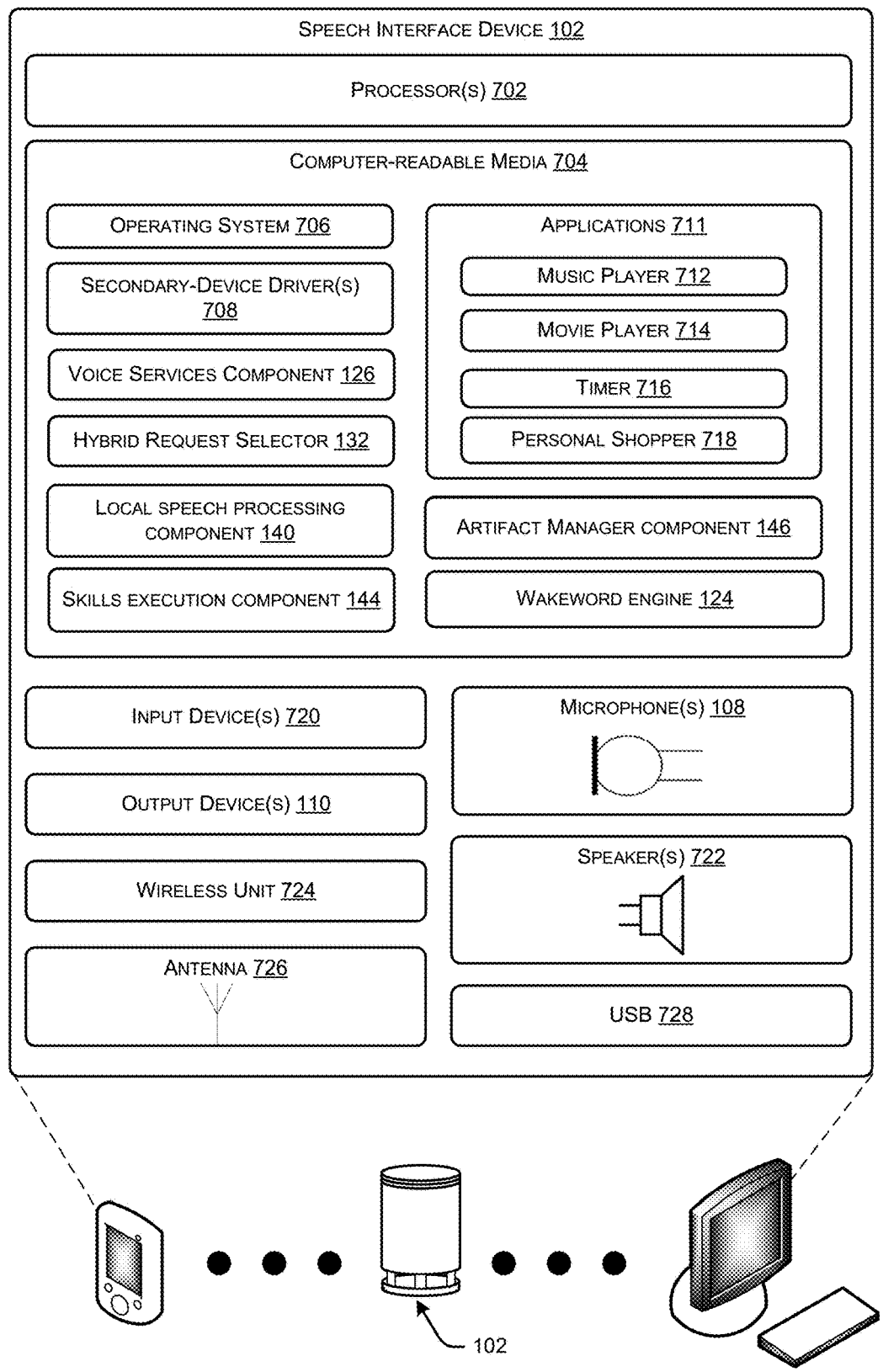
FIG. 7 illustrates example components of an electronic device, such as the speech interface device of FIG. 1.

FIG. 7 illustrates example components of an electronic device, such as the speech interface device 102 of FIG. 1. The speech interface device 102 may be implemented as a standalone device that is relatively simple in terms of functional capabilities with limited input/output components, memory, and processing capabilities. For instance, the speech interface device 102 may not have a keyboard, keypad, or other form of mechanical input. The speech interface device 102 may not have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 702 and computer-readable media 704 (often referred to herein as "memory" of the speech interface device 102, and/or "local memory" of the speech interface device 102). In some implementations, the processors(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program modules, program data and/or other data, and/or one or more operating systems.

The computer-readable media 704 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 704 may be implemented as computer-readable storage media ("CRSM"), which may be any available physical media accessible by the processor(s) 702 to execute instructions stored on the memory 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 702.

Several modules such as instruction, datastores, and so forth may be stored within the computer-readable media 704 and configured to execute on the processor(s) 702. A few example functional modules are shown as applications stored in the computer-readable media 704 and executed on the processor(s) 702, although the same functionality may alternatively be implemented in hardware, firmware, or as a system on a chip (SOC). At least some of the components and/or threads shown in FIG. 1 may also be stored in the computer-readable media 704 and/or executable by the processor(s) 702 to implement the functionality described herein. For example, the voice services component 126, the hybrid request selector 132, the local speech processing component 140, the skills execution component 144, and the artifact manager component 146, as well as their subcomponents, may be stored in the computer-readable media 704 and executable by the processor(s) 702 to implement the functionality described herein.

An operating system module 706 may be configured to manage hardware within and coupled to the speech interface device 102 for the benefit of other modules. In addition, the speech interface device 102 may include one or more secondary-device drivers 708 for sending control commands to second devices collocated in an environment with the speech interface device 102. The speech interface device 102 may further include the aforementioned wakeword engine 124.

The speech interface device 102 may also include a plurality of applications 711 stored in the computer-readable media 704 or otherwise accessible to the speech interface device 102. In this implementation, the applications 711 are a music player 712, a movie player 714, a timer 716, and a personal shopper 718. However, the speech interface device 102 may include any number or type of applications and is not limited to the specific examples shown here. The music player 712 may be configured to play songs or other audio files. The movie player 714 may be configured to play movies or other audio visual media. The timer 716 may be configured to provide the functions of a simple timing device and clock. The personal shopper 718 may be configured to assist a user in purchasing items from web-based merchants. When implementing the "hybrid" functionality described herein, where a remote system 116 is unavailable to the speech interface device 102, these applications 711 may be configured to access local resources (e.g., local music or movie libraries, a local shopping list, a local calendar, etc.). In some cases, changes made to these local resources may be synched with remote versions of those resources when the remote system 116 subsequently becomes available to the speech interface device 102.

The artifact manager 146 may be configured to implement, or at least initiate, a language update process on the speech interface device 102 in response to an indication of a request to set the language setting of the speech interface device 102 to a new language spoken in a particular locale. These techniques for updating the locale on the device 102 are described in detail elsewhere herein. In general, the artifact manager 146 may be the authority on supported locales and the driver of language changes/updates.

Generally, the speech interface device 102 has input devices 720 and output devices 110. The input devices 720 may include, without limitation, a keyboard, keypad, mouse, touch screen, joystick, control buttons, etc. In some implementations, one or more microphones 108, introduced in FIG. 1, may function as input devices 720 to receive audio input, such as user voice input. The output device(s) 110, introduced in FIG. 1, may include, without limitation, a display(s), a light element (e.g., LED), a vibrator to create haptic sensations, or the like. In some implementations, one or more speakers 722 may function as output devices 110 to output audio sounds (e.g., audio content, TTS responses, other voice prompts, tones at various frequencies, etc.).

A user 104 may interact with the speech interface device 102 by speaking to it, and the one or more microphone(s) 108 captures the user's speech (utterances). The speech interface device 102 can communicate back to the user 104 by emitting audible statements through the speaker(s) 722. In this manner, the user 104 can interact with the speech interface device 102 solely through speech, without use of a keyboard or display.

The speech interface device 102 may further include a wireless unit 724 coupled to an antenna 726 to facilitate a wireless connection to a network. The wireless unit 724 may implement one or more of various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over the wide area network 118. As such, the speech interface device 102 may be configured to act as a hub that can communicate with second devices in the environment and control the second devices, such as by using protocol stacks, drivers, and adapters to communicate over a suitable communications protocol. A USB port(s) 728 may further be provided as part of the speech interface device 102 to facilitate a wired connection to a network, or a plug-in network device that communicates with other wireless networks. In addition to the USB port 728, or as an alternative thereto, other forms of wired connections may be employed, such as a broadband connection, Transmission Control Protocol/Internet Protocol (TCP/IP) protocol connection, etc. The communications interface 112 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 108. Further, there may be no output such as a display for text or graphical output. The speaker(s) 722 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A speech interface device comprising:
   one or more processors; and
   non-transitory computer-readable memory storing computer-executable instructions that, when executed by the one or more processors, cause performance of operations comprising:
     receiving an indication of a request to change a language setting of the speech interface device from a first language to a second language;
     changing a state variable of a speech processing component executing on the speech interface device from a first value to a second value, the second value indicating that a language update is in progress and that the speech processing component is currently unable to process audio data representing an utterance spoken in the second language;
     receiving, by a hybrid execution controller (HEC) component executing on the speech interface device, first status data indicating that the state variable of the speech processing component is set to the second value;
     deleting, from non-volatile memory of the speech interface device, one or more first automatic speech recognition (ASR) models associated with the first language and one or more first natural language understanding (NLU) models associated with the first language;
     downloading, to the non-volatile memory of the speech interface device, one or more second ASR models associated with the second language, one or more second NLU models associated with the second language, one or more text-to-speech (TTS) models associated with the second language, and skill prompt data associated with the second language;
     receiving, by the HEC component, second status data indicating that the state variable of the speech processing component is set to the first value, the first value indicating that the language update is complete and that the speech processing component is ready to process the audio data representing the utterance spoken in the second language;
     receiving, by the HEC component, a connection request from a hybrid proxy (HP) component, the connection request including language data indicating that the HP component is set to the second language; and
     accepting, by the HEC component, the connection request based at least in part on the second status data and the language data.

2. The speech interface device of claim 1, wherein the connection request is a second connection request, the operations further comprising:
   downloading voice prompt data associated with the second language;
   receiving, by the HEC component prior to the second connection request, a first connection request from the HP component, the first connection request including the language data;
   rejecting, by the HEC component based at least in part on the first status data, the first connection request;
   sending, by the HEC component based at least in part on the language data, metadata to the HP component indicating that the HP component is to retry connecting to the HEC after a period of time;
   receiving, by the HP component, the audio data representing the utterance spoken in the second language; and
   outputting, based at least in part on the metadata, and via an output device of the speech interface device, a voice prompt in the second language by processing the voice prompt data.

3. The speech interface device of claim 1, wherein the HP component is a first HP component executing on the speech interface device, and wherein the connection request is a first connection request, the operations further comprising:
   receiving, by the HEC component, a second connection request from a second HP component executing on a second speech interface device, the second connection request including second language data indicating that the second HP component is associated with a different language than the second language;
   determining that the language setting of the speech interface device is set to the second language; and
   rejecting, by the HEC component, the second connection request based at least in part on the different language being different than the second language.

4. The speech interface device of claim 1, the operations further comprising, after the accepting of the connection request:

receiving, by the HEC component, from the HP component, the audio data representing the utterance spoken in the second language;

receiving the audio data as input to the speech processing component;

generating, by the speech processing component, directive data based at least in part on the audio data, the one or more second ASR models associated with the second language, and the one or more second NLU models associated with the second language; and performing an action based at least in part on the directive data.

5. The speech interface device of claim 1, the operations further comprising, prior to the receiving of the connection request from the HP component:

sending, by the HEC component based at least in part the HP component being associated with the first language, a disconnection instruction to the HP component to disconnect from the HP component.

6. A method comprising:

receiving, by a speech interface device having a language setting set to a first language, an indication of a request to set the language setting to a second language;

receiving, by a first component of the speech interface device, first status data indicating that a language update is in progress;

receiving second status data indicating that the language update is complete;

receiving a connection request that includes language data indicating that the speech interface device is operable to process an utterance in the second language; and processing the connection request based at least in part on the second status data and the language data.

7. The method of claim 6, further comprising, after the receiving of the indication:

sending, to a remote system, a download request for data that is usable by a speech processing component of the speech interface device to process audio data representing the utterance in the second language;

receiving, from the remote system based at least in part on the download request, one or more language models associated with the second language; and storing, in non-volatile memory of the speech interface device, the one or more language models associated with the second language.

8. The method of claim 7, further comprising:

receiving, from the remote system based at least in part on the download request, voice prompt data associated with the second language; and storing, in the non-volatile memory of the speech interface device, the voice prompt data.

9. The method of claim 8, wherein the connection request is a second connection request received from a second component, the method further comprising, prior to the receiving of the second status data:

receiving, by the first component, a first connection request from the second component, the first connection request including the language data;

rejecting, based at least in part on the first status data, the first connection request;

sending, by the first component based at least in part on the language data, metadata to the second component indicating that the second component is to retry connecting to the first component after a period of time;

receiving, by the second component, the audio data representing the utterance in the second language; and outputting, based at least in part on the metadata, and via an output device of the speech interface device, a voice prompt in the second language based at least in part on the voice prompt data.

10. The method of claim 7, further comprising:

sending, by the first component based at least in part a second component being associated with the first language, a disconnection instruction to the second component to disconnect from the second component; and deleting, from the non-volatile memory of the speech interface device, one or more language models associated with the first language, wherein the sending of the download request occurs after the deleting of the one or more language models associated with the first language, and wherein the receiving of the connection request comprises receiving the connection request from the second component after the sending of the disconnection instruction to the second component.

11. The method of claim 10, further comprising, after the deleting of the one or more language models associated with the first language:

receiving, as input to the speech processing component, second audio data representing an utterance in the first language;

generating, by the speech processing component, failure data indicating a failure to recognize an intent based at least in part on the second audio data; and sending the second audio data to a second speech interface device collocated in an environment with the speech interface device.

12. The method of claim 6, wherein the connection request is a first connection request received from a second component of the speech interface device, the method further comprising:

receiving, by the first component, a second connection request from a third component of a second speech interface device, the second connection request including second language data indicating that the third component is associated with a different language than the second language;

determining that the language setting of the speech interface device is set to the second language; and rejecting the second connection request based at least in part on the different language being different than the second language.

13. The method of claim 6, further comprising:

loading, by a speech processing component of the speech interface device, to volatile memory of the speech interface device, one or more language models associated with the second language; and after the processing of the connection request:

receiving, by the first component, audio data representing the utterance in the second language;

receiving the audio data as input to the speech processing component;

generating, by the speech processing component, directive data based at least in part on the audio data and the one or more language models associated with the second language; and performing an action based at least in part on the directive data.

14. The method of claim 13, wherein the or more language models associated with the second language are one or more second language models associated with the second language, and wherein one or more first language models associated with the first language are loaded in the volatile memory of the speech interface device, the method further comprising:

processing the audio data using the one or more first language models associated with the first language to generate first intent data;

processing the audio data using the one more second language models associated with the second language to generate second intent data; and determining to use the second intent data to generate the directive data.

15. A speech interface device comprising:

one or more processors; and non-transitory computer-readable memory storing computer-executable instructions that, when executed by the one or more processors, cause performance of operations comprising:

receiving an indication of a request to set a language setting of the speech interface device to a second language, wherein the language setting is set to a first language prior to the receiving of the indication;

receiving, by a first component of the speech interface device, first status data indicating that a language update is in progress;

receiving second status data indicating that the language update is complete;

receiving a connection request that includes language data indicating that the speech interface device is operable to process an utterance in the second language; and processing the connection request based at least in part on the second status data and the language data.

16. The speech interface device of claim 15, wherein the connection request is a second connection request received from a second component, the operations further comprising, prior to the receiving of the second status data:

receiving, by the first component, a first connection request from the second component, the first connection request including the language data;

rejecting, based at least in part on the first status data, the first connection request;

sending, by the first component based at least in part on the language data, metadata to the second component indicating that the second component is to retry connecting to the first component after a period of time;

receiving, by the second component, audio data representing the utterance in the second language; and outputting, based at least in part on the metadata, and via an output device of the speech interface device, a voice prompt in the second language.

17. The speech interface device of claim 15, wherein the connection request is a first connection request received from a second component of the speech interface device, the operations further comprising:

receiving, by the first component, a second connection request from a third component of a second speech interface device, the second connection request including second language data indicating that the third component is associated with a different language than the second language;

determining that the language setting of the speech interface device is set to the second language; and rejecting the second connection request based at least in part on the different language being different than the second language.

18. The speech interface device of claim 15, the operations further comprising:

loading, by a speech processing component of the speech interface device, to volatile memory of the speech interface device, one or more language models associated with the second language; and after the processing of the connection request:

receiving, by the first component, audio data representing the utterance in the second language;

receiving the audio data as input to the speech processing component;

generating, by the speech processing component, directive data based at least in part on the audio data and the one or more language models associated with the second language; and performing an action based at least in part on the directive data.

19. The speech interface device of claim 15, the operations further comprising:

sending, by the first component based at least in part a second component being associated with the first language, a disconnection instruction to the second component to disconnect from the second component; and deleting, from non-volatile memory of the speech interface device, one or more language models associated with the first language.

20. The speech interface device of claim 15, the operations further comprising, after the receiving of the indication:

sending, to a remote system, a download request for data that is usable by a speech processing component of the speech interface device to process audio data representing the utterance in the second language;

receiving, from the remote system based at least in part on the download request, one or more language models associated with the second language; and storing, in non-volatile memory, the one or more language models associated with the second language.

* * * * *